(12) United States Patent
Bushman et al.

(10) Patent No.: US 8,961,948 B2
(45) Date of Patent: Feb. 24, 2015

(54) MOLECULAR SURFACE DESIGN OF TYROSINE-DERIVED POLYCARBONATES FOR ATTACHMENT OF BIOMOLECULES

(75) Inventors: Jared S. Bushman, Franklin Park, NJ (US); Jenny E. Raynor, Phoenixville, PA (US); Joachim B. Kohn, Piscataway, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 249 days.

(21) Appl. No.: 13/352,268

(22) Filed: Jan. 17, 2012

(65) Prior Publication Data

US 2012/0231519 A1   Sep. 13, 2012

Related U.S. Application Data

(60) Provisional application No. 61/433,355, filed on Jan. 17, 2012.

(51) Int. Cl.
| | | |
|---|---|---|
| *A61K 31/74* | (2006.01) | |
| *C08G 63/685* | (2006.01) | |
| *C08G 63/64* | (2006.01) | |
| *C08G 63/91* | (2006.01) | |
| *C08G 64/12* | (2006.01) | |
| *C08G 64/18* | (2006.01) | |
| *C08G 64/42* | (2006.01) | |
| *C08G 69/40* | (2006.01) | |
| *C08G 69/44* | (2006.01) | |

(52) U.S. Cl.
CPC ............ *C08G 63/6856* (2013.01); *C08G 63/64* (2013.01); *C08G 63/916* (2013.01); *C08G 64/12* (2013.01); *C08G 64/183* (2013.01); *C08G 64/42* (2013.01); *C08G 69/40* (2013.01); *C08G 69/44* (2013.01)

USPC ........................................................ 424/78.17

(58) Field of Classification Search
None
See application file for complete search history.

(56) References Cited

U.S. PATENT DOCUMENTS

| | | |
|---|---|---|
| 5,099,060 A | 3/1992 | Kohn et al. |
| 5,198,507 A | 3/1993 | Kohn et al. |
| 5,216,115 A | 6/1993 | Kohn et al. |
| 5,658,995 A | 8/1997 | Kohn et al. |
| 5,912,225 A | 6/1999 | Mao et al. |
| 6,103,255 A | 8/2000 | Levene et al. |
| 6,120,491 A | 9/2000 | Kohn et al. |
| 6,238,687 B1 | 5/2001 | Mao et al. |
| 6,284,862 B1 | 9/2001 | Kohn et al. |
| 6,475,477 B1 | 11/2002 | Kohn et al. |
| 2005/0106119 A1 | 5/2005 | Brandom et al. |
| 2006/0034769 A1 | 2/2006 | Kohn et al. |
| 2010/0166854 A1 | 7/2010 | Michniak-Kohn et al. |

OTHER PUBLICATIONS

Huang, Biotin-Derivatized Poly(L-lysine)-g-poly(ethylene glycol): A Novel Polymeric Interface for Bioaffinity Sensing, Lanmuir, 2002, 18, 220-230.*

Rojas, R. et al., Evaluation of Automated Synthesis for Chain and Step-Growth Polymerizations: Can Robots Replace the Chemists?, Journal of Polymer Science: Part A: Polymer Chemistry, vol. 47, 49-58 (2009).

Schut, J. et al., Glass transition temperature prediction of polymers through the mass-per-flexible-bond principle, Polymer, vol. 48 (20) (2007), 49-58.

* cited by examiner

*Primary Examiner* — Paul Dickinson
(74) *Attorney, Agent, or Firm* — Fox Rothschild LLP

(57) ABSTRACT

Methods for constructing tyrosine-derived biotinylated polymers. Biotinylated polymers and polymer scaffolds constructed with the biotinylated polymers are also disclosed.

20 Claims, 11 Drawing Sheets

DTR:desamino tyrosine-R    DT:desamino tyrosine    PEG:poly(ethylene glycol)

US 8,961,948 B2

MOLECULAR SURFACE DESIGN OF TYROSINE-DERIVED POLYCARBONATES FOR ATTACHMENT OF BIOMOLECULES

CROSS-REFERENCE TO RELATED APPLICATION

The present application claims priority benefit under 35 USC §119(e) of U.S. Provisional Patent Application Ser. No. 61/433,355 filed Jan. 17, 2012, the disclosure of which is incorporated herein by reference.

GOVERNMENT LICENSE RIGHTS

This invention was made with government support under AFIRM Grant No. 429429 awarded by the Department of Defense. The government has certain rights in the invention.

FIELD OF THE INVENTION

The present invention relates to the tethering of biomolecules to synthetic polymer-based scaffolds for use in assisting the healing of various wounds and injuries.

BACKGROUND OF THE INVENTION

Synthetic polymer-based scaffolds have been successfully utilized to assist in the healing process of wounds unable to heal on their own. In such wounds, called critical sized defects, the appropriate cells fail to infiltrate sufficiently into the wound site and create the tissue that was lost in the injury. Compounding this problem is the lack of sufficient biological cues, such as growth factors, cytokines, and hormones that induce endogenous cells to migrate into injury sites, proliferate, and differentiate into all of the tissue types needed to repair the wound. Instead of the appropriate tissue replacing the lost tissue in critical sized defects, inflammatory cells and fibrotic cells infiltrate the injury site and form scar tissue that, if left in place, will act as a barrier and is likely to permanently prevent tissue regeneration.

The use of scaffolds to facilitate healing of critical size defects is provides multiple benefits. Scaffolds provide structural support to an injury site. Such structural support is essential as structurally deficient voids have a tendency of prolonging the injury response and often lead to further injury when stress, such as that caused by patient movement, is placed on the injury site. Scaffolds can also be fabricated to contain an interconnected inner porous structure where the pores provide a bridge for cells to infiltrate throughout the scaffold. The proximity of the scaffold with the injured tissue helps ensure that the appropriate cell types enter the structure. Additionally, as the scaffold degrades over time newly formed tissue can take its place and provide structure to the affected area. Further, as a compliment to enhancing appropriate regeneration, scaffolds can also act as a physical barrier to inappropriate cell types, such as macrophages and fibrotic cells, from infiltrating and forming a scar. The slowing of scar formation is essential because the regenerative process is generally in competition with scar formation.

While scaffolds alone have been found to help with the healing of increased size defects, further enhancement appears to be necessary to effectively heal large defects. In the case of craniofacial bone reconstruction, a critical size defect in the rabbit calvaria is 15 mm. Optimization of the scaffold composition, porosity, and degradation can enhance regeneration but the scaffold alone fails to promote the formation of bone throughout the defect area. Consequently, there is a need to introduce biological cues that can aide in the regenerative process.

Proteins, such as cytokines and growth factors, are potent inducers of cellular activity and as such have tremendous potential to be combined with scaffolds to achieve optimal regeneration. Predicate devices for bone fusions, such as Medtronic's Infuse™, Mastergraft™, and Amplify™ are mixtures of recombinant human bone morphogenetic protein (rhBMP-2) with bovine collagen sometimes in a ceramic scaffold. Recombinant human platelet derived growth factor-BB (rhPDGF-BB) is another protein with osteoinductive capability, and has been mixed with a ceramic by Biomimetic Inc. and marketed as Augment Bone Graft™ to aid in bone fusions of the ankle and foot. Several other such devices exist, all being variations upon the theme of mixing rhBMP-2 or rhPDGF-BB with collagen or a ceramic material. The effects of these devices are well established for their on-label uses for bone fusions, most often aimed toward the spinal cord. Off-label uses of these items, although technically prohibited, are thought to be common for applications that currently have no approved devices.

In the previously mentioned devices, the cytokines are mixed with the other components of the devices and are not specifically bound. The inability to specifically tether or bind the proteins to the devices likely necessitates using more rhBMP-2 and rhPDGF-BB than is actually necessary to achieve the desired cell and tissue responses. As the devices take up water and begin to erode/degrade, the rhBMP-2 and rhPDGF-BB will be released into the surrounding tissue. Good manufacturing practice (GMP) production of rhBMP-2 is thought to exceed $50,000 per milligram, making the use of excess rhBMP-2 or rhPDGF-BB very costly.

A possible solution to this issue is to tether the biomolecules (such as rhBMP-2 and rhPDGF-BB) to the scaffold. Such tethering would prevent the biomolecules from being wasted by diffusing out of the injury site while still allowing the biomolecules to interact with cell surface receptors to induce the desired biological response. The prolonged presence of the biomolecules, due to prevention of the diffusing away of the biomolecules, would enable a longer time period for inducing biological responses. This greatly decreases the quantity of the biomolecules needed to induce the desired cell and tissue responses, and hence the cost of the treatments. Lowering the costs of these treatments further allows for their expanded use in a clinical setting.

There has been much effort to develop a device with tethered biomolecules, yet no predicate devices exist. This is due to a combination of the following issues: (i) inefficiency of the tethering reaction of the biomolecule with the scaffold, (ii) slow speed of tethering reactions of biomolecules to the scaffolds, (iii) high cost of GMP biomolecules, particularly recombinant proteins, (iv) reduced potency of biomolecules that are tethered versus free, (v) difficulty tethering biomolecules uniformly throughout scaffolds, (vi) incompatibility of polymer solvents with biomolecules, particularly recombinant proteins, and (vii) inflexibility of tethering platform to easily adapt to a variety of biomolecules and scaffold devices. While some of these issues, such as cost of GMP proteins, are unavoidable, many of the remaining issues must be addressed in order to field a viable device that utilizes a protein tethering strategy.

SUMMARY OF THE INVENTION

In one aspect, the present invention is directed to a method for creating a biotinylated polymer comprising the steps of:

(1) providing a biocompatible polymer having monomeric repeating units with at least one free carboxylic acid group; (2) activating the carboxylic acid group on said biocompatible polymers, thereby priming the carboxylic acid group for nucleophilic attack; and (3) reacting the activated carboxylic acid group with a nucleophile, wherein the nucleophile has a biotin component.

In certain embodiments, the biocompatible polymer used in this method comprises tyrosine-derived monomeric repeating units having the structure:

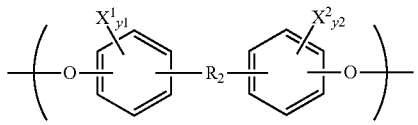

wherein each X is independently H, I or Br, Y1 and Y2 for each diphenol unit are independently between 0 and 4, inclusive;

each $R_2$ independently has the structure:

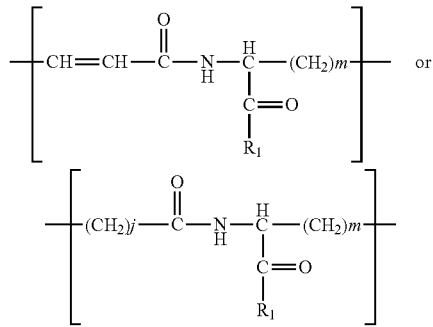

wherein j and m are independently an integer from 1 to 8, inclusive, and wherein the subgroup $R_1$ is an OH group.

Tyrosine-derived polymers according to this embodiment include tyrosine-derived polymers having the structure: of Formula I:

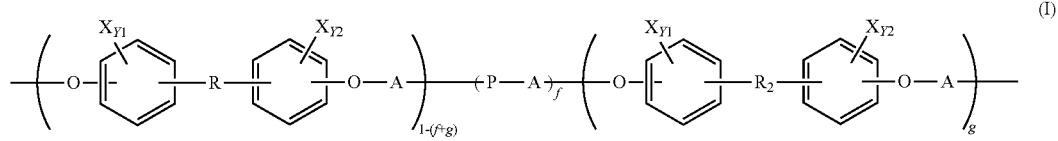

(I)

wherein each X is independently H, I or Br, Y1 and Y2 for each diphenol unit are independently between 0 and 4, inclusive;

each R and $R_2$ independently has the structure:

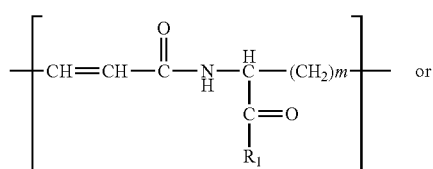

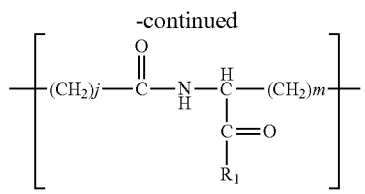

wherein j and m are independently an integer from 1 to 8, inclusive, and wherein, for $R_2$, the subgroup $R_1$ is a hydrogen atom, and, for each R, $R_1$ is independently an —O-alkyl group, wherein the alkyl group contains from 1 to 18 carbon atoms and from 0 to 5 heteroatoms selected from O and N;

A is selected from:

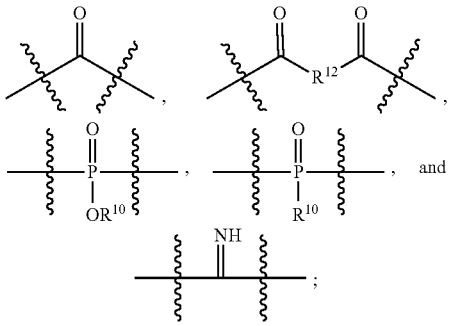

wherein $R^{10}$ is selected from H, $C_1$-$C_{30}$ alkyl, alkenyl and alkynyl and $C_2$-$C_{30}$ heteroalkyl; heteroalkenyl and heteroalkynyl, and $R^{12}$ is selected from $C_1$-$C_{30}$ alkyl, alkenyl and alkynyl, $C_1$-$C_{30}$ heteroalkyl; heteroalkenyl and heteroalkynyl, $C_5$-$C_{30}$ heteroalkylaryl, heteroalkenylary and heteroalkynylaryl, $C_6$-$C_{30}$ alkylaryl, alkenylaryl and alkynylaryl and $C_5$-$C_{30}$ heteroaryl;

P is a poly($C_1$-$C_4$ alkylene glycol) unit having a molecular weight between about 500 and about 20,000; f is between 0 and about 0.60; g is between about 0.1 and 1.0; and f+g is between about 0.1 and 1.0.

In certain embodiments, the tyrosine-derived polymer may be a polycarbonate or a polyarylate.

In certain embodiments of the present invention a multivalent protein is bound to the biotinylated polymer. This multivalent protein may be selected from streptavidin, avidin and neutravidin. Additionally, a biotinylated molecule may be bound to the multivalent protein. In one embodiment, the biotinylated molecule may be selected from biotinylated antibodies, proteins and enzymes. According to another embodiment, the biotinylated molecules are biotinylated recombinant human proteins. According to a more specific embodiment the recombinant human protein is a bone morphogenic protein.

In carrying out the method described above, the biocompatible polymer may first be dissolved in a solvent. Additionally, in certain embodiments, the carboxylic acid residues may be activated by either 1-ethyl-3-(3-dimethylaminopropyl) carbodiimide or N,N'-dicyclohexylcarbodiimide. Further, in another embodiment, 1-hydroxybenzotriazole may be added to prime the biocompatible polymer for nucleophilic attack.

In certain embodiments, the nucleophile used to carry out the method described above has a free amine group or a free hydroxyl group. In another embodiment, the nucleophile also includes a poly(ethylene glycol) component.

In another aspect the present invention provides biotinylated polymers with tyrosine-derived monomeric repeating units having the structure:

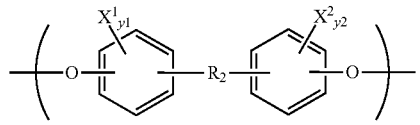

wherein each X is independently H, I or Br, Y1 and Y2 for each diphenol unit are independently between 0 and 4, inclusive;

each $R_2$ independently has the structure:

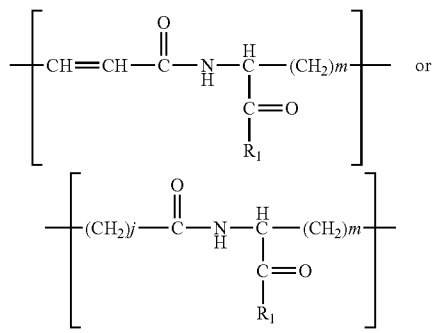

wherein j and m are independently an integer from 1 to 8, inclusive, and wherein the subgroup $R_1$ comprises biotin.

Tyrosine derive biotinylated polymers within this embodiment include polymers having the structure of Formula I:

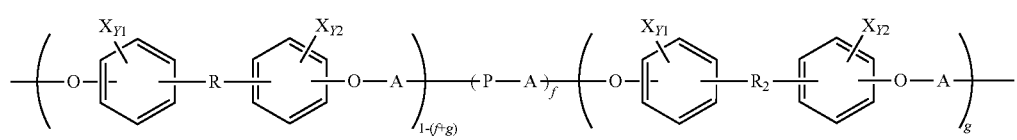

wherein each X is independently H, I or Br, Y1 and Y2 for each diphenol unit are independently between 0 and 4, inclusive;

each R and $R_2$ independently has the structure:

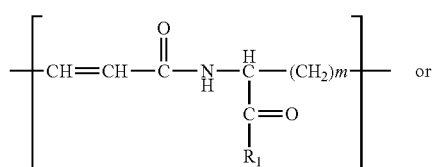

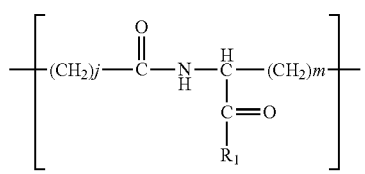

wherein j and m are independently an integer from 1 to 8, inclusive, and wherein, for $R_2$, between about 0.1 and about 99.0 percent of the $R_1$ subgroups comprise biotin and between about 1 and about 99.9 percent of the $R_1$ subgroups are an OH group, and, for each R, $R_1$ is independently an O-alkyl group, wherein the alkyl group contains from 1 to 18 carbon atoms and from 0 to 5 heteroatoms selected from O and N;

A is selected from:

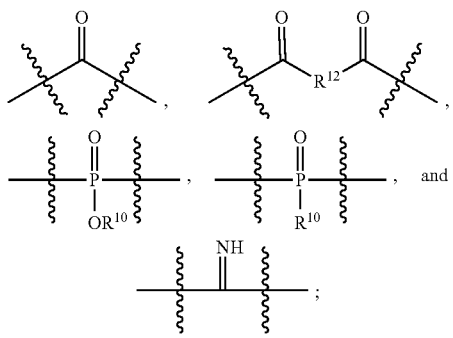

wherein $R^{10}$ is selected from H, $C_1$-$C_{30}$ alkyl, alkenyl and alkynyl and $C_2$-$C_{30}$ heteroalkyl; heteroalkenyl and heteroalkynyl, and $R^{12}$ is selected from $C_1$-$C_{30}$ alkyl, alkenyl and alkynyl, $C_1$-$C_{30}$ heteroalkyl; heteroalkenyl and heteroalkynyl, $C_5$-$C_{30}$ heteroalkylaryl, heteroalkenylary and heteroalkynylaryl, $C_6$-$C_{30}$ alkylaryl, alkenylaryl and alkynylaryl and $C_5$-$C_{30}$ heteroaryl;

P is a poly($C_1$-$C_4$ alkylene glycol) unit having a molecular weight between about 500 and about 20,000; f is between 0 and about 0.60; g is between about 0.1 and 1.0; and f+g is between about 0.1 and 1.0.

In certain embodiments, the biotinylated polymers further comprising a plurality of multi-valent biotin-binding proteins bound to the $R_1$ subgroups of $R_2$ that comprise biotin. In more specific embodiments, the multivalent biotin-binding protein is selected from streptavidin, avidin and neutravidin.

In certain embodiments biotinylated molecules are bound to the multivalent proteins. In more specific embodiments, the biotinylated molecules are selected from biotinylated antibodies, proteins, and enzymes. According to one embodiment, the biotinylated proteins are biotinylated recombinant human proteins. According to another embodiment the recombinant human proteins are biotinylated bone morphogenic proteins.

In another aspect, the present invention is directed to a biocompatible polymer scaffold having at least one biotinylated polymer prepared according to the method described above; at least one multivalent protein bound to the biotinylated polymer; and at least one biotinylated biomolecule bound to the multivalent protein. In certain embodiments, the multivalent protein is selected from streptavidin, avidin, and neutravidin.

In one embodiment, the polymer scaffold also includes non-biotinylated polymers. In certain embodiments, the ratio between biotinylated polymers to non-biotinylated polymers may range between about 50:50 and about 20:80.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF PREFERRED EMBODIMENTS

Figure 1:
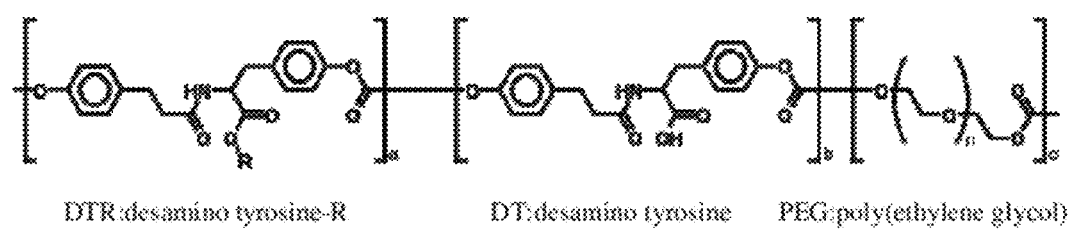
FIG. 1 shows structures of the three components comprising the polymeric scaffolds according to the present invention used for medical devices as identified by U.S. Pat. No. 6,120,491. Desaminotyrosyl tyrosine-R(R=carboxylic acid ester), desaminotyrosyl tyrosine, and poly(ethylene glycol) are polymerized to form a terpolymer.

Applicants have chosen a family of polymers derived from tyrosine as the base material to develop a tethering strategy. The tyrosine-derived monomers of U.S. Pat. No. 5,099,060 polymerize and the resulting polymers are amenable to cells in vitro and tissues in vivo. In their current status, these polymers lack any specifically directed bioactivity other than allowing protein and cells to attach through non-specific mechanisms. Although the invention will be described in terms of a specific embodiment, it will be readily apparent to those skilled in this art that various modifications, rearrangements, and substitutions can be made without departing from the spirit of the invention. In particular, while the modification of a tyrosine-derived polycarbonate is described, this is done for purposes of illustration; the present invention can be applied successfully to essentially any biocompatible polymer capable of being activated for nucleophilic attack, including, but not limited to, the various tyrosine-derived polymers disclosed by U.S. Pat. No. 6,120,491. The disclosures of both U.S. Pat. Nos. 5,099,060 and 6,120,491 are incorporated herein by reference.

The presently claimed method for tethering relies on the high affinity of the compound biotin for polyvalent biotin binding proteins. Biotin is a naturally occurring complex-B vitamin (also called vitamin H) that the average person consumes 35 to 70 µg of per day. Foods with relatively high portions of biotin include eggs, liver, wheat, and some vegetables. Biotin is an essential cofactor in several enzymes involved in energy metabolism, and biotin deficiency in humans most commonly leads to alopecia and dermatitis. Given that dermatitis and alopecia are treated by giving patients increased amounts of biotin (≥an order of magnitude greater than what is consumed on a daily basis), the risk of toxicity via excess biotin is minimal as is the case with most vitamins. As such, biotin has ideal characteristics for use in medical devices in that it is naturally occurring, and has a low potential for toxicity.

Biotin has an extraordinarily high affinity for the multivalent biotin binding proteins streptavidin, avidin, and neutravidin. The dissociation constant (Kd) for biotin and these three proteins approaches $10^{-15}$ molar. This interaction is one of the strongest known non-covalent interactions and is essentially irreversible in physiological conditions. Although streptavidin, avidin, and neutravidin are interchangeable in the system here described, Applicants have chosen to use streptavidin in most of the examples here mentioned due to its cost and previous use in clinical studies. Streptavidin is a deglycosylated low-immunogenic protein isolated from bacteria that contains four spatially separate biotin-binding sites. The presence of these four distinct biotin-binding sites allows streptavidin to act as a linker molecule between a biotinylated polymer and a biotinylated biomolecule. In this way, biotinylated biomolecules can be tightly tethered to the polymer via the strong bond of biotin and multivalent biotin-binding proteins. This system for tethering is a fast, efficient method for tethering any single or combination of biomolecules to polymer surfaces.

One embodiment of the present invention thus relates to a method for improving the ability of biocompatible polymers to act as inducing agents and general platforms for displaying molecules by alteration of the polymers by molecular surface design. In a more specific embodiment, this method comprises activating the carboxylic acid residues on biocompatible polymers containing desaminotyrosyl-tyrosine monomeric repeating units with free carboxylic acid groups, thereby priming the carboxylic acid residues for nucleophilic attack; and attacking the activated carboxylic acid residues with a nucleophile, thereby covalently attaching the molecule to the desamino-tyrosine; wherein the nucleophile is any compound or protein with compatible chemistry. In one embodiment of the present invention, the nucleophile is an aminobiotin nucleophile that has a single free amine that forms an amide bond with the activated carboxylic acid residue.

One of ordinary skill in the art guided by the present specification will understand that the present invention can be applied to essentially any biocompatible polymer that is capable of being activated for nucleophilic attack. For example, diphenols are monomeric starting materials for polycarbonates, polyarylates, and the like. Commonly owned U.S. Pat. Nos. 5,099,060 and 5,198,507 disclose amino acid-derived diphenol compounds useful in the polymerization of polycarbonates and polyiminocarbonates. The resulting polymers are useful as degradable polymers in general and as tissue-compatible, bioerodible materials for medical uses, in particular. The suitability of these polymers for their end use application is the result of their polymerization from diphenols derived from the naturally occurring amino acid, L-tyrosine. The disclosures of U.S. Pat. Nos. 5,099,060 and 5,198,507 are hereby incorporated by reference.

The same monomeric L-tyrosine derived diphenols are also used in the synthesis of polyarylates as described in commonly owned U.S. Pat. No. 5,216,115 and in the synthesis of poly(alkylene oxide) block copolymers with the aforementioned polycarbonates and polyarylates, which is disclosed in commonly owned U.S. Pat. No. 5,658,995. The disclosures of U.S. Pat. Nos. 5,216,115 and 5,658,995 are also hereby incorporated by reference.

Commonly owned U.S. Pat. No. 6,284,862 discloses dihydroxy monomers prepared from hydroxy acid amides of L-tyrosine that are also useful starting materials in the polymerization of polycarbonates, polyarylates, and the like. The preparation of polycarbonates and polyarylates from these monomers is also disclosed. The disclosure of U.S. Pat. No. 6,284,862 is also hereby incorporated by reference.

Additional biocompatible polymer starting materials suitable for use in the present invention include the phosphorus-containing polymers described in U.S. Patent Publication Nos. 20060034769 and 20050106119 and U.S. Pat. Nos. 5,912,225 and 6,238,687, the disclosures of all of which are incorporated by reference.

Commonly owned U.S. Pat. No. 6,120,491 discloses the preparation of polymers containing the free carboxylic acid groups that are capable of activation for nucleophilic attack. The disclosure of this patent is also incorporated by reference.

Polymeric starting materials according to the present invention include polymers with tyrosine-derived monomeric repeating units having the structure:

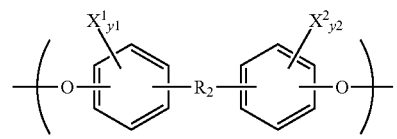

wherein each X is independently H, I or Br, Y1 and Y2 for each diphenol unit are independently between 0 and 4, inclusive;

each $R_2$ independently has the structure:

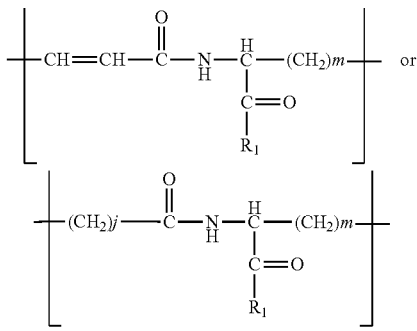

wherein j and m are independently an integer from 1 to 8, inclusive, and wherein the subgroup $R_1$ is an OH group.

According to one embodiment of the invention the tyrosine-derived monomers are copolymerized with poly(alkylene oxides), poly(trimethylene carbonate), poly(lactic acid), poly(glycolic acid), poly(lactic-co-glycolic acid), tyrosine-derived monomers in which $R_1$ is an O-alkyl group, wherein the alkyl group contains from 1 to 18 carbon atoms and from 0 to 5 heteroatoms selected from O and N; and combinations thereof.

Included within this embodiment are polymers having the structure of Formula I:

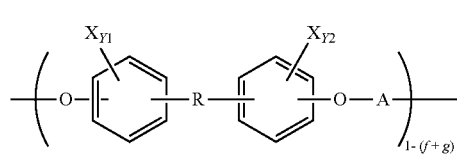
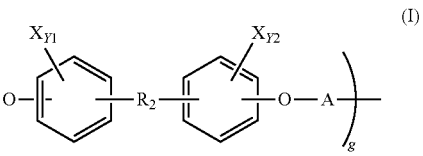

(I)

wherein each X is independently H, I or Br, Y1 and Y2 for each diphenol unit are independently between 0 and 4, inclusive;

each R and $R_2$ independently has the structure:

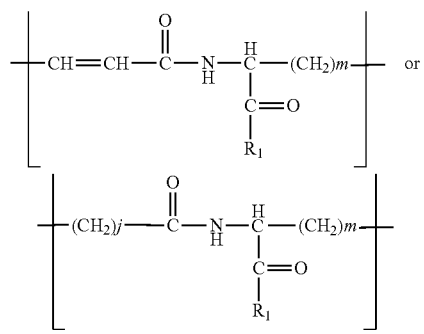

wherein j and m are independently an integer from 1 to 8, inclusive, and wherein, for $R_2$, the subgroup $R_1$ is OH, and, for each R, $R_1$ is independently O-alkyl group, wherein the alkyl group contains from 1 to 18 carbon atoms and from 0 to 5 heteroatoms selected from O and N;

A is selected from the group consisting of:

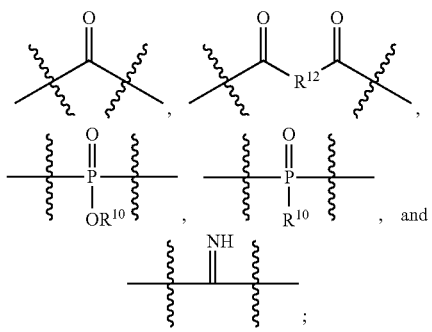

wherein $R^{10}$ is selected from the group consisting of H, $C_1$-$C_{30}$ alkyl, alkenyl and alkynyl and $C_2$-$C_{30}$ heteroalkyl; heteroalkenyl and heteroalkynyl, and $R^{12}$ is selected from the group consisting of $C_1$-$C_{30}$ alkyl, alkenyl and alkynyl, $C_1$-$C_{30}$ heteroalkyl; heteroalkenyl and heteroalkynyl, $C_5$-$C_{30}$ heteroalkylaryl, heteroalkenylary and heteroalkynylaryl, $C_6$-$C_{30}$ alkylaryl, alkenylaryl and alkynylaryl and $C_5$-$C_{30}$ heteroaryl;

P is a poly($C_1$-$C_4$ alkylene glycol) unit having a molecular weight between about 500 and about 20,000; f is between 0 and about 0.60; g is between about 0.1 and 1.0; and f+g is between about 0.1 and 1.0.

In one embodiment of the present invention, P is a poly(ethylene glycol) unit having a molecular weight between about 750 and about 5000; f is from about 0.01 to about 0.50; g is from about 0.01 to about 0.25; and f+g is from about 0.75 to about 0.98. In a more specific embodiment, the poly(ethylene glycol) has a molecular weight between about 1000 and about 2000; f is from 0.01 to about 0.15; g is from about 0.04 to about 0.20; and f+g is from about 0.80 to about 0.95.

In another embodiment of the present invention, j=2 and m=1.

Polymers with at least one bromine- or iodine-substituted aromatic ring are radio-opaque, such as the polymers prepared from radiopaque diphenol compounds prepared according to the disclosure of U.S. Pat. No. 6,475,477, as well as the disclosure of co-pending and commonly-owned U.S. patent application Ser. No. 10/952,202, (published) the disclosures of both of which are incorporated herein by reference. U.S. patent application Ser. No. 10/952,202 also discloses an alternative method for the preparation of polymers containing the free carboxylic acid groups by selective removal of t-butyl protecting groups.

It is also understood that in the presentation of the various polymer formulae that the polymer structures represented may include homopolymers and heteropolymers, which include stereoisomers. Homopolymer is used herein to designate a polymer comprised of all the same type of monomers. Heteropolymer is used herein to designate a polymer comprised of two or more different types of monomer, which is also called a copolymer. A heteropolymer or copolymer may be of kinds known as block, random and alternating. Further, with respect to the presentation of the various polymer formulae, products according to embodiments of the present invention may be comprised of a homopolymer, heteropolymer and/or a blend of such polymers and repeating units may be present other than those depicted by Formula I.

In another embodiment of the present invention, the method for preparing a biotinylated polymer includes: (1) dissolving a polymer in solvent (THF or other); (2) activating the polymer carboxylic acid residues via a carbodiimide such as 1-ethyl-3-(3-dimethylaminopropyl) carbodiimide ("EDC") or N,N'-dicyclohexylcarbo-diimide ("DCC"); (3) adding HOBt as a leaving group to prime for nucleophilic attack; (4) adding a nucleophile; (5) stirring to help the reaction proceed; and (6) precipitating the modified polymer to isolate it and then dry it overnight in a vacuum oven.

Following the method, at least about 0.1 percent of the $R_1$ subgroups of the $R_2$ moieties comprise biotin. In one embodiment at least about 1 percent of the $R_1$ subgroups of the $R_2$ moieties comprise biotin. In another embodiment, between about 0.5 and about 99 percent of the $R_1$ subgroups of the $R_2$ moieties comprise biotin. In yet another embodiment, between about 1.0 and about 30 percent of the $R_1$ subgroups of the $R_2$ moieties comprise biotin.

A plurality of multi-valent biotin-binding proteins can then be bound to the $R_1$ subgroups of $R_2$ that comprise biotin. In one embodiment, the multivalent biotin-binding protein is selected from streptavidin, avidin and neutravidin.

In certain embodiments biotinylated molecules are bound to the multivalent proteins. In more specific embodiments, the biotinylated molecules are selected from biotinylated antibodies, proteins, and enzymes. Biotinylated proteins include biotinylated peptides such as PSA, HNK-1, L1, P12, B2A, peptide hormones, and peptides that mimic the activity of growth factors, cytokines, or other naturally occurring peptide biomolecules, (e.g., L1, P12, insulin peptides, etc), and the like.

Biotinylated molecules also include miscellaneous biologicals such as biotinylated lipids, proteolipids, DNAs, RNAs, vitamins, antioxidants, amino acids, steroids (i.e., dexamethasone, testosterone), synthetic molecules such as dendrimers, and the like.

Biotinylated antibodies include biotinylatyed aCD44, anti-MOG antibodies, Toll-like receptor antibodies, 3F8, 8H9, Abciximab, Adalimumab, Alemtuzumab Abagovomab, Abcimiximab, Adecatumumab, Afelimomab, Afutuzumab, Alacizumab, ALD518, Altumomab penetate, Amatuximab, Anatumomab mafenatox, Anrukinzumab, Apolizumab, Aselizumab, Atinumab, Atlizumab, Atorolimumab, Bavituximab, Bectumomab, Belimumab, Benralizumab, Bertilimumab, Besilesomab, Bevacizumab, Beciromab, Bivatuzumab mertansine, Blinatumomab, Blosozumab, Brentuximab vedotin, Briakinumab, Brodalumab, Canakinumab, Cantuzumab mertansine, Cantuzumab ravtansine, Capromab pendetide, Carlumab, Catumaxomab, CC49, Cedelizumab, Certolizumab pegol, Cetuximab, Citatuzumab bogatox, Cixutumamab, Clenoliximab, Clivatuzumab tetraxetan, Conatumumab, Crenezumab, CR6261, Dacetuzumab, Daclizumab, Dalotuzumab, Daratumumab, Denosumab, Detumomab, Dorlimomab aritox, Drozitumab, Ecromeximab, Eculizumab, Edobacomab, Edrecolomab, Efalizumab, Efungumab, Elotuzumab, Elsilimomab, Enavatuzumab, Enlimomab pegol, Enokizumab, Ensituximab, Epitumomab cituxetan, Epratuzumab, Erlizumab, Ertumaxomab, Etaracizumab, Etrolizumab, Exbivirumab, Fanolesomab, Faralimomab, Farletuzumab, FBTA05, Felvizumab, Fezakinumab, Ficlatuzumab, Figitumumab, Flanvotumab, Fontolizumab, Foralumab, Foravirumab, Fresolimumab, Fulranumab, Galiximab, Ganibumb, Gantereumab, Gavilimomab, Gemtuzumab ozogamicin, Gevokizumab, Girentuximab, Glembatumumab vedotin, Golimumab, Golimiximab, GS6624, Ibalizumab, Ibritumomab tiuxetan, Icrucumab, Igovomab, Imciromab, Indatuximab ravtansine, Infliximab, Intetumab, Inolimomab, Inotuzumab ozogamicin, Ipilimumab, Iratumumab, Itolizumab, Ixekizumab, Keliximab, Labetuzumab, Lebrikizumab, Lemalesomab, Lerdelimumab, Lexatumumab, Libivirumab, Lintuzumab, Lorvotuzumab mertasine, Lucatumumab, Lumiliximab, Mapatumumab, Maslimomab, Mavrilimumab, Matuzumab, Mepolizumab, Metelimumab, Milituzumab, Minretumomab, Mitumomab, Mogamulizumab, Morolimumab, Motavizumab, Moxetumomab pasudotox, Muromonab-CD3, Nacolomab tafenatox, Namilumab, Naptumomab estafenatox, Narnatumab, Natalizumab, Nebacumab, Necituximab, Nerelimomab, Nimotuzumab, Nofetumomab merpetan, Ocrelizumab, Odulimomab, Ofatumumab, Olaratumab, Olokizumab, Omalizumab, Onartuzumab, Oportuzumab monatox, Oregovamab, Otelixizumab, Oxelumab, Ozoralizumab, Pagibaximab, Palivizumab, Panitumumab, Panobacumab, Pascolizumab, Pateclizumab, Pemtumomab, Pertuzumab, Pexelizumab, Pintumomab, Ponezumab, Priliximab, Pritumumab, PRO140, Racotumomab, Radretumab, Rafivirumab, Ramicurumab, Ranibizumab, Raxibacumab, Regavirumab, Resizumab, Rilotumumab, Rituximab, Robatumumab, Roledumab, Romosozumab, Rontalizumab, Rovelizumab, Ruplizumab, Samarizumab, Sarilumab, Satumomab pendetide, Secukinomab, Sevirumab, Sibrotuzumab, Sifalimumab, Siltuximab, Siplizumab, Sirukumab, Solenzumab, Sonepcizumab, Sonttuzumab, Stamulumab, Sulesomab, Suvizumab, Tabalumab, Tacatuzumab tetraxetan, Tadocizumab, Talizumab, Tanezumab, Tapilumomab paptox, tefibazumab, Telimomab aritox, Tenatumomab, Teneliximab, Teplizumab, Teprotumumab, TGN1412, Ticilmumab, Tigatuzumab, TNX-650, Tocilizumab, Toralizurnab, Tositumomab, Tralokinumab, Trastuzumab, TRBS07, Tregalizumab, Tremelimumab, Tucotuzumab celmoleukin Tuvirumab, Ublituximab, Urelumab, Urtoxazumab, Ustekinumab, Vapaliximab, Vatelizumab, Vedolizumab, Veltuzumab, Vepalimomab, Vesencumab, Visilizumab, Volociximab, Votumumab, Zalutumumab, Zanolimumab, Ziralimumab, antibodies that were raised to bind to the proteins listed below, and the like.

Other biotinylated proteins include biotinylated Nerve growth factors (NGFs), brainderived neurotrophic factors (BDNFs), glial cell line-derived neurotrophic factors (GDNFs), fibroblast growth factors (FGFs), bone morphogenetic proteins (BMPs), transforming growth factors (TGFs), Notch proteins, Wnt proteins, insulin, insulin-like growth factors (IGFs), interleukins (ILs), interferons (INFs), epidermal growth factors (EGFs), platelet-derived growth factors (PDGFs), sirtuins, histones, angiopoetins, adrenomedullins, autocrine motility factors, erythropoietins, granulocyte colony-stimulating factors, granulocyte macrophage colony-stimulating factors, growth differentiation factor-9, hepatocyte growth factors (HGFs), hepatoma-derived growth factors, migration-stimulating factors, myostatins, neurotrophins, thrombopoietins, transforming growth factor alphas (TGFαs), transforming growth factor betas (TGFβs), tumor necrosis factors (TNFs), vascular endothelial growth factors (VEGFs), placental growth factors, foetal bovine somatotrophin, lipopolysaccharides, phytohaemagglutinin, concanavalin, pokeweed mitogen, haemopoietic growth factors, leptins, leukemia inhibitory factors (LIFs), noggins, CD44, selectins, colony stimulating factors (CSFs), catalases, superoxide dismutases, glutathione reductase, glutathione synthase, gluathione transferases, gamma-glutamyl-cysteine synthetase, glutathione transferases, glutathione, peroxidases, myelin oligodendrocyte glycoproteins (MOGs), immunoglobulin-like transcripts (ILTs), immunoglobulins (Igs), MG53, P53, Ras, Myc, Cullin, F-box proteins, Hox proteins, FoxO proteins, Olig 2, NuMA, DNA polymerases, RNA polymerases, Ribosomal proteins, chondroitenases, collagenases, trypsins, papains, matrix metallo proteases, lipases, ligases, lyases, hydrolases, oxidoreductases, Fas proteins, extracellular matrix molecules (fibronectins, vitronectins, collagens, glycans/polysaccharides, proteoglycans, laminins, elastins, keratins, heparins, heparan sulfates, chondroitin sulfates, dermatan sulfates, keratan sulfates hyaluronic acid, syndecans, tenascins, fibrins, fibrinogens), matric metallo proteases (MMPs), BSA, trypsin inhibitors, polysialic acid, human natural killer-1, L1, myelin-associated glycoprotein, neural cell adhesion molecule (NCAM), A2B5, glucoses, sucroses, amino acids, etc., and the like.

Still other biotinylated proteins include biotinylated receptors or receptor fragments for the above named proteins, glycans, and proteoglycans: NGF receptors, BMP receptors, etc., and the like.

Accordingly, the biotinylated molecules include biotinylated recombinant human proteins, including recombinant human proteins such as bone morphogenic proteins.

In yet another embodiment of the present invention, porous polymer scaffolds for tissue regeneration are provided, formed from the modified polymers of the present invention to which biomolecules can be tethered. Means by which biocompatible polymers can be formed into polymer scaffolds are well-known, examples of which include the porous polymer scaffolds of U.S. Pat. No. 6,103,255, the disclosure of which, including non-limiting examples of desirable biomolecules to be tethered to the polymers, is incorporated by reference. However, essentially any state of the art technique for forming resorbable tissue scaffolds from biocompatible polymers may be employed. The biomolecules can be tethered to the polymers prior to scaffold formation, or they can be tethered after the scaffold is formed. Additionally, in certain embodiments of the present invention, distinct biomolecules can be tethered to a single scaffold at discrete locations.

The tyrosine-derived polycarbonate used as the base polymer is actually a terpolymer composed of 3 different monomeric units (FIG. 1). For the purposes of this disclosure, to simplify the naming of the tyrosine-derived terpolymers, the notation RXXYY(MW) is used to name poly(DTR-co-XX %-DT-co-YY %-PEGMW carbonate) where R is the alkyl pendent chain (E=ethyl; B=butyl; H=hexyl; O=octyl; etc.), XX is the mole percent of DT, YY is the mole percent of PEG and MW is the weight average molecular weight of PEG. As an example, poly(DTE carbonate) will be designated as E0000, while poly(DTE-co-10%-DT-co-1%-PEG1K carbonate) will have a notation of E1001 (1K).

In addition to using the E2002 (1K) polymer, the polymer E1001 (1K) was chosen as a base polymer due to its successful application in healing the rabbit calvaria defect. This polymer allows for the application of the present invention in vivo. However, given the results for E2002 (1K), it should be understood that any desamino-tyrosine polymer combination containing free carboxylic acids (DT residues) would be suitable for the method of the present invention. The DT monomer displays a carboxylic acid that can be used to covalently attach chemical moieties to the polymers.

Naturally occurring biotin is chemically unsuitable for attachment to the desamino-tyrosine terpolymers, as a single free amine or hydroxyl group would be needed to act as the nucleophile on the activated acid. For the purposes of the present invention, the amine is favored over the hydroxyl as the amine results in the very stable amide bond whereas the hydroxyl would result in an ester bond that is susceptible to hydrolysis. The PEG component of the amino-PEG-biotin was selected to aid in the hydrophilicity of the attachment to promote availability of the biotin residue in an aqueous environment, as biotin alone is extremely hydrophobic.

For the following examples, streptavidin was favored over neutravidin due to the more extensive base of literature using streptavidin in human clinical cancer trials. It should be noted that all biotin binding proteins, such as neutravidin, streptavidin, and avidin would work equally well to act as the linker protein.

The following examples provide the methods and materials used to carry out one embodiment of the present invention. It should not be used to limit the scope of the invention.

EXAMPLES

Base Polymer Synthesis

Tyrosine-derived polycarbonates were synthesized by polycondensation reactions according to previously published procedures (R. Rojas, et al., *J. Polym. Sci., Part a—Polymer Chemistry*, 2009, 47, 49-58; J. Schut et al., *Polymer*, 2007, 48, 6115-6124). The tyrosine-derived polycarbonate used as the base polymer is actually a terpolymer composed of 3 different monomeric units (FIG. 1): desamino tyrosine-R (R=ethyl ester), desamino tyrosine, and poly(ethylene glycol).

Figure 2:
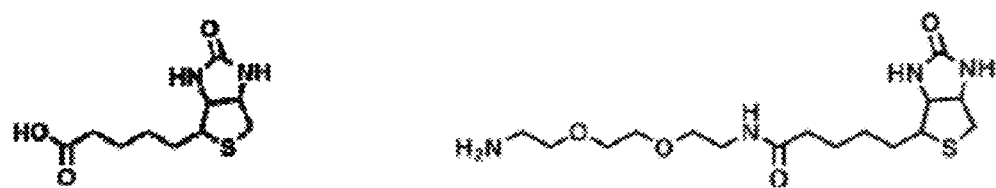
FIG. 2 displays the chemical structure of naturally occurring biotin (left) and amino-PEG-biotin (right) that is used as a nucleophile to attack the free carboxylic acid residue on the desamino tyrosine terpolymer shown in FIG. 1.
Figure 3:
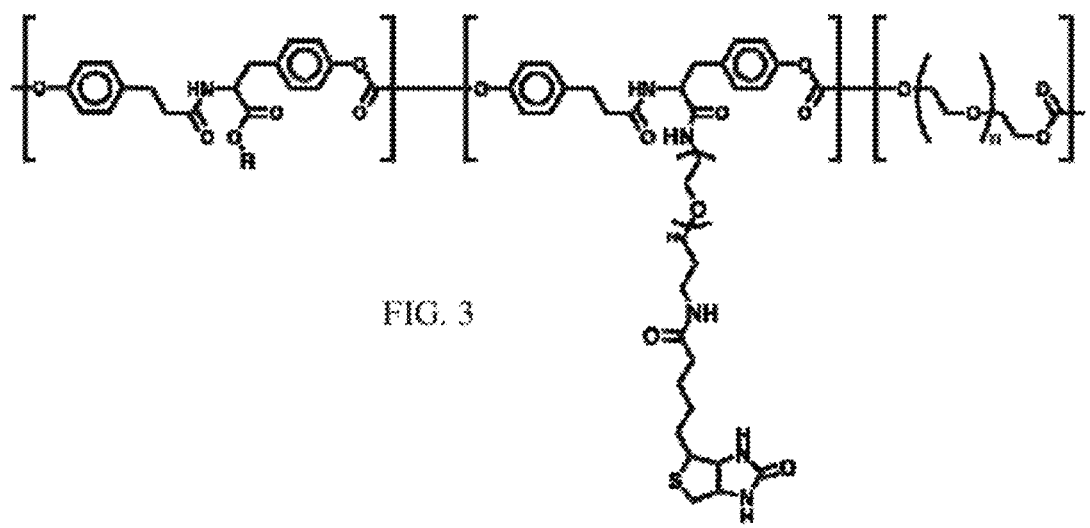
FIG. 3 displays the chemical structure of a tyrosine derived polycarbonate terpolymer modified with an amino-PEG-biotin attached to the site of the carboxylic acid.

Modification of Base Polymer with Biotin:

Numerous reaction conditions are possible for attaching linkers to the free carboxylic acid group of the DT within the terpolymer. Those here employed follow the general characteristics of:

First: dissolving the terpolymer in solvent (THF or other);
Second: activation of the carboxylic acid via a carbodiimide via EDC or DCC;
Third: add leaving group HOBt to prime for nucleophilic attack;
Fourth: addition of the nucleophile;
Fifth: stir to help the reaction proceed; and
Sixth: precipitate modified polymer to isolate it and dry overnight in vacuum oven Here, Applicants selected E2002 (1 k) polymer of the desamino-tyrosine polycarbonate family of polymers (FIG. 1) as the base material and reacted it with a molar equivalent of amino-PEG-biotin (FIG. 2) to the molar equivalents of free carboxylic acids on DT residues in the polymer. Using EDC or DCC, the carboxylic acid group on polymers were activated, followed by addition of HOBt to act as a leaving group when attacked by the free amine on the amino-PEG-Biotin. An illustration of the modified polymer is shown in FIG. 3, where the amino group of the amino-PEG-biotin is attached to the activated carboxylic acid group on the desamino tyrosine residue of the terpolymer, forming an amide bond.

Fluorescent Binding Neutravidin Assay:

A fluorescently labeled neutravidin was used to assess whether the modified polymer was capable of binding a biotin-binding protein. The E2002 (1K) polymer was modified as described above, using an equivalent molar ratio of the amino-PEG-biotin as the free carboxylic acid groups on the DT residues. The resulting biotinylated polymer and the control non-biotinylated E2002 (1K) were solvent cast into wells of a 96 well plate. Surfaces were first blocked with 20% FBS, followed by 3 washes with PBS containing 0.1% Tween 20. Fluorescently labeled neutravidin was added to the wells and incubated for 2 hours at room temperature. Wells were washed as before and 50 ul of PBS was added to the wells. The relative binding of the fluorescently labeled neutravidin was assessed by fluorescent microscopy where the exposure time and gain were fixed from the wells with the most fluorescence and these parameters were used to image the remaining wells.

Figure 4:
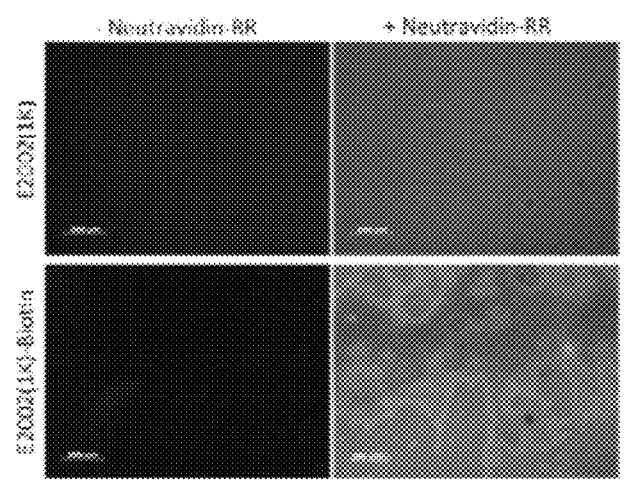
FIG. 4 shows fluorescent images of biotinylated E2002 (1K) and non-biotinylated E2002 (1K) incubated with and without a fluorescently labeled neutravidin (rhodamine-red). Gain and exposure times were kept constant to obtain all images.

FIG. 4 shows that wells containing the modified polymer showed a higher fluorescent signature than the unmodified control polymer. This result indicates that the E2002 (1K) polymer was successfully modified by the reaction and displayed biotin residues capable of binding the fluorescent neutravidin. In addition to using neutravidin to assess whether the modified polymer is capable of binding a biotin-binding protein, streptavidim can also be used.

Figure 5:
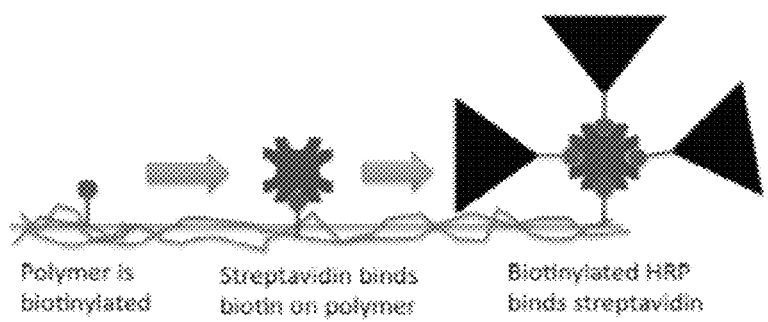
FIG. 5 provides a schematic representation of assay to determine biotinylation of polymer.

Assessment of Biotinylation by Luminescence Assay:

To identify the ideal amount of the biotin linker to attach to the E1001 (1K) polymer, the modification reaction was performed using differing concentrations of the amino-PEG-biotin linker relative to the molar ratio of the carboxylic acid residues contained within the polymer. Five different molar ratios of amino-PEG-biotin to available COOH residues on the terpolymer were tested in the reaction (1:1, 0.75:1, 0.5:1, 0.25:1, and 0.125:1) so as to gauge the most effective parameters. To verify the functional attachment of the biotin residue to the polymer, Applicants utilized the high affinity of the biotin-streptavidin interaction and biotinylated horse radish peroxidase (bHRP) enzyme (FIG. 5). Polymers were solvent cast in 96-well polypropylene plates and blocked with 20% FBS in DMEM (invitrogen). Streptavidin was added to the solution in which the polymer film was submersed and incubated for 30 mins. Following incubation with streptavidin, the films were washed 3 times with PBS and (bHRP) was added to the solution and bound to the remaining biotin-binding sites on the streptavidin. To determine relative amounts of bHRP bound to the polymer surface, luminol was added and the luminescence was measured by a plate reader assay and the resulting luminescence was representative of the amount of bHRP tethered to the polymer surface via biotin-streptavidin interactions. Controls were included of polymers incubated with only streptavidin or bHRP as well as polymer with only luminol.

Figure 6:
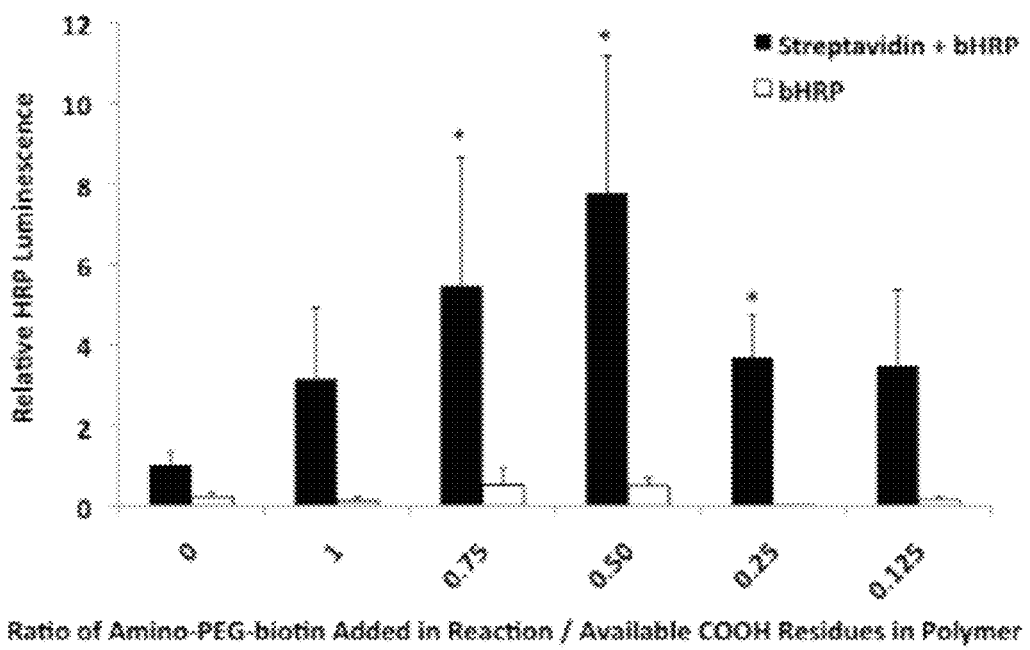
FIG. 6 illustrates the elevated attachment of biotinylated HRP to biotinylated polymers via streptavidin.

As shown in FIG. 6, the luminescence from the surfaces indicated that the polymer was functionally biotinylated. Increased luminescence indicates that more streptavidin and bHRP are attached to the surface. Relative to the unmodified polymer all molar ratios of amino-PEG-biotin in the reaction conditions yielded a polymer with improved binding of bHRP visualized by generation of luminescence compared to unmodified base polymer, becoming statistically significant for 0.75, 0.5 and 0.25 molar equivalents of amino-PEG-biotin ($p<0.05$). The efficacy of adsorption of bHRP on the surface without streptavidin was found to have limited luminescent activity, indicating that bHRP has low affinity to the biotinylated polymer and non-biotinylated control polymer. This is an important control and shows the difference between specific tethering of a protein to the surface (via streptavidin) and the adsorption of the biotinylated-HRP to the surface non-specifically.

For all subsequent examples of the present invention detailed herein, the 0.5 molar equivalent biotinylated E1001 (1K) was used. However, it should be understood that other molar equivalents of biotinylated E1001(K) could be used in alternative embodiments of the present invention.

Nuclear Magnetic Resonance:

To verify the covalent attachment of the amino-PEG-biotin to the polymer backbone, $^1$H NMR was performed. For all analyses, a Varian VNMRS spectrometer 500 MHz was used (Varian Inc., Palo Alto, Calif.). 25 mg of dry polymer sample were dissolved in $d^6$-dimethylsulfoxide (Sigma-Aldrich, St. Louis, Mo.). The number of scans per experiment was set to 256 to allow for a high signal-to-noise ratio. Fourier transformation and analysis such as integration of the spectra was performed using the program MestRe Nova (Mestrelab Research SL, Spain). A peak associated with dimethylsulfoxide at $\delta=2.50$ ppm was used as the reference point in the spectra.

Figure 7:
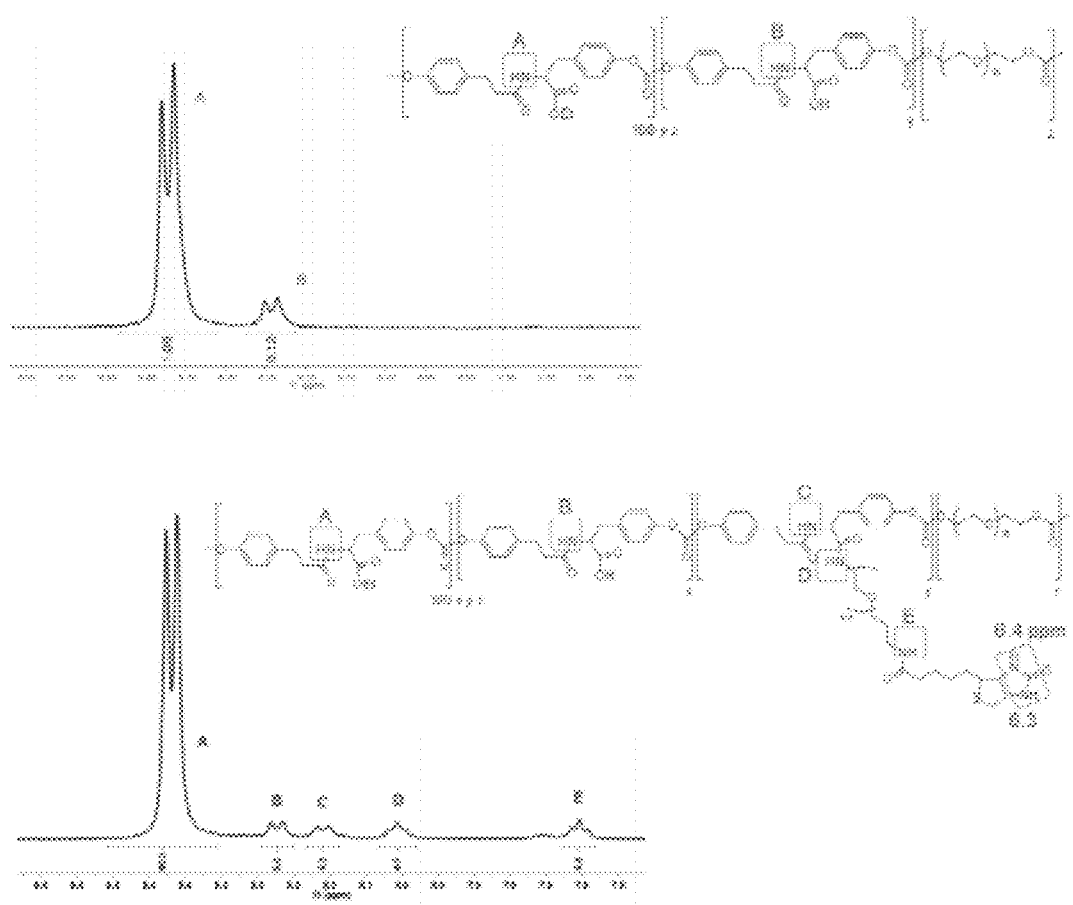
FIG. 7 shows chemical structures and 500 MHz $^1$H-NMR spectrum of unmodified E1001 (1K) (Top) and biotinylated E1001 (1K) (Bottom) zoomed into region of NH-amide chemical shift. A: NH-amide of desaminotyrosyl-tyrosine ethyl ester; B: NH-amide of desaminotyrosyl-tyrosine; C: NH-amide of pendant chain substituted desaminotyrosyl-tyrosine; D: pendant NH-amide bond of desamniotyrosyl-tyrosine; E: biotinyl NH-amide.

Because the attachment of the amino-PEG-biotin would yield an additional amide in the polymer, the area under the curve of peaks associated with amide protons of the polymers was used to analyze side-chain substitution. Unmodified E1001 (1K) typically shows two distinct peaks in the region of amide chemical shift (FIG. 7—top): NH-amide of desaminotyrosyl-tyrosine ethyl ester (d, $\delta=8.38$ ppm, J=7.5 Hz, A) and NH-amide of desaminotyrosyl-tyrosine (d, $\delta=8.24$ ppm, J=7.8 Hz, B). Additional peaks appear in the spectrum of biotinylated E1001 (1 k) (FIG. 7—bottom): NH-amide of pendant chain substituted desaminotyrosyl-tyrosine (d, $\delta=8.17$, J=8.4 Hz, C), pendant NH-amide bond of desamniotyrosyl-tyrosine (t, $\delta=8.07$ ppm, D) and biotinyl NH-amide (t, $\delta=7.82$ ppm, J=5.4 Hz, 1H). The ratio of the peaks A, B and C was used to calculate the degree of biotinylation, revealing that according to the reaction parameters, 50% of the carboxylic acid residues on the polymer backbone were modified and attached to the amino-PEG-biotin.

Protein Tethering by Quartz Crystal Microbalance with Dissipation (QCM-D):

After confirming the degree of biotinylation of the polymer backbone, Applicants characterized in more detail the kinetics and masses of proteins that can be tethered to biotinylated and non-biotinylated polymers. Quartz crystal microbalance with dissipation (QCM-D) can be used to measure these parameters. QCM-D measures the frequency change of a quartz crystal where a decrease in frequency indicates protein binding to the surface. To test the protein binding efficiency of the biotinylated E1001 (1K) versus non-biotinylated E1001 (1K), the polymers, each in the form of a solution of 1% in dioxane, were spin coated onto quartz crystal and dried under vacuum and nitrogen. QCM-D was initiated by running PBS over the polymers to equilibrate with an aqueous solution. Thereafter solutions of streptavidin (25 µg/mL), BSA (50 µg/mL), and/or a biotinylated BSA (bBSA) were passed over the polymer coated crystals at the rate of 24.2 µl/minute. Protein attachment was allowed to reach equilibrium in each experiment, as gauged by the frequency change.

Figure 8:
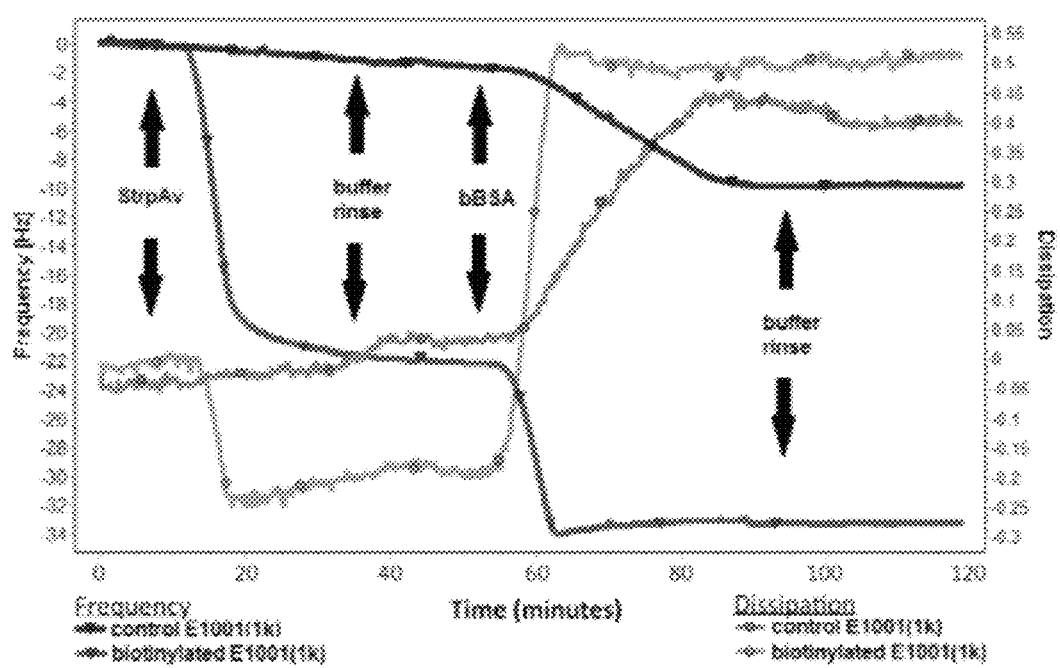
FIG. 8 shows binding of streptavidin (StrpAv) and biotinylated BSA (bBSA) to polymer surfaces measured by quartz crystal microbalance with dissipation (QCM-D).

The results of the QCM-D experiments showed that the biotinylated polymer quickly bound the maximal amount streptavidin within a few minutes of streptavidin addition and was not displaced from the polymer surface by washing with PBS (FIG. 8). In contrast, the minimal frequency change of the unmodified polymer indicates that very little streptavidin bound to the polymer. Following the wash to remove any non-specifically bound streptavidin, bBSA was passed over the polymer-coated quartz crystals. Biotinylated E1001 (1K) quickly bound up the maximal amount of bBSA whereas the unmodified polymer showed a gradual decrease in frequency that indicates non-specific binding to the surface.

Figure 9:
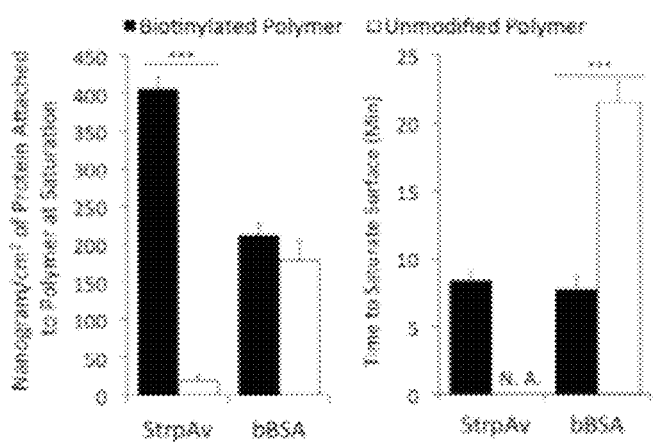
FIG. 9 illustrates quantification of mass and kinetics of protein tethering and adsorption to biotinylated and control polymer. Mass and kinetics were calculated from the QCM-D data, with the mass calculated from the Sauerbrey equation.

The dissipation data gained from the experiment indicate that for both polymers, the rigidity of the protein layer was maintained upon binding to the polymers (dissipation≤1). This allows for the quantification of the wet masses of the proteins that bind to the surfaces based on the Sauerbrey equation. Extrapolation of this data showed that under saturation conditions of streptavidin followed by bBSA, the biotinylated E1001 (1K) polymer binds an average of 407 ng of streptavidin per cm$^2$ of polymer surface area and then an additional 211 ng of bBSA per cm$^2$ (FIG. 9). In comparison streptavidin did not appreciably adsorb on the non-biotinylated polymer and an average of 178 ng/cm$^2$ of bBSA adsorbed non-specifically to the surface of the non-biotinylated polymer.

The value of using QCM-D is that in addition to giving quantifiable data on the amounts of proteins tethered, the process is measured in real time, allowing for the analysis of tethering kinetics. Thus, the time interval between when streptavidin of bBSA were introduced into the QCM-D and when half the maximal amount of protein became tethered to the surface was quantified. For the biotinylated polymer, approximately 8 minutes was needed to achieve this amount for both streptavidin and bBSA (FIG. 9). As the kinetics of protein tethering is known to vary widely based on individual protein characteristics, the similarities between streptavidin and bBSA tethering indicates that both proteins are tethering by the same mechanism of biotin-streptavidin binding. In contrast, bBSA adsorption to the non-biotinylated polymer followed classical non-specific adsorption characteristics and required 22 minutes to achieve half the maximal protein attachment. Streptavidin adsorption to the non-biotinylated polymer was minimal and erratic, making it impossible to determine whether saturation had occurred or not on the non-biotinylated polymer. It should be noted that quantification began after the switch was activated introducing the proteins into the tubes connected to the chambers with the polymers. Thus, the quantification here includes the time needed for the proteins to flow through the tubes at the flow rate of 24.2 µl per minute before reaching the polymers, indicating that the actual tethering speed is faster than what is here represented.

Figure 10:
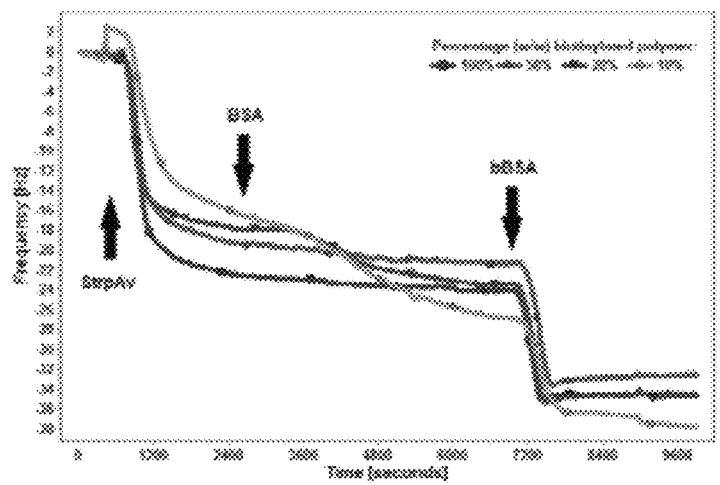
FIG. 10 shows protein binding on polymer blends of biotinylated E1001 (1K) and unmodified E1001 (1K) measured by QCM-D. Blends of 50:50 and 20:80 biotinylated to unmodified E1001 (1K) are sufficient to achieve maximal protein tethering as evidenced by frequency changes associated with the binding of streptavidin and biotinylated BSA (bBSA).

Having found that the biotinylated E1001 (1K) bound streptavidin and bBSA to form tight monolayers, Applicants next determined the necessary amount of the biotinylated E1001 (1K) necessary to achieve saturation tethering of these proteins. Biotinylated E1001 (1K) was blended with non-biotinylated E1001 (1K) at ratios of 50:50, 20:80, and 10:90 and protein tethering was assessed by QCM-D. FIG. 10 shows that in comparison to the 100% biotinylated E1001 (1K), the 50:50 and 20:80 blends showed near equivalent frequency drops after addition of streptavidin.

This experiment was identical to the previously discussed QCM-D experiment, with the exception that non-biotinylated BSA was added after streptavidin had been tethered and before bBSA was added. The inclusion of this data point shows that even though there were minor differences in the streptavidin adsorption of the 50:50 blend compared to the 100% biotinylated polymer, no frequency changes were noted once BSA was introduced, indicating that the surfaces were functionally saturated with streptavidin, and BSA could not appreciably adsorb to this surface. This was not the case for the 20:80 and 10:90 blends where a slight drop in frequency after addition of BSA indicates that BSA was able to adsorb non-specifically to the polymer surface in gaps between tethered streptavidin proteins. However, once bBSA was introduced into the chambers it was apparent that the 50:50 and 20:80 blends showed drops in the frequency (~12 Hz) identical to that of the 100% biotinylated polymer. The blend of 10:90 showed only a drop of 8 Hz after addition of bBSA, indicating one or a combination of two scenarios; (i) that the initial amount of streptavidin was insufficient to tether the full amount of bBSA or (ii) that the BSA that adsorbed to the surface that the adsorption of the non-biotinylated BSA to this surface prevented some amount of specific tethering of bBSA. Therefore, it can be concluded that blends of 20:80 of biotinylated E1001 (1K) to non-biotinylated E1001 (1K) are sufficient to achieve maximal protein tethering.

Cell Attachment to Polymers:

As the E1001 (1K) polymer has been previously reported to be well suited for cell attachment, Applicants verified that the biotin modification does not alter this property. 15 mm glass cover slips were coated with biotinylated and non-biotinylated polymer solution via spin coating (1% in THF), dried in a vacuum oven, and sterilized by UV irradiation for 20 minutes. Primary human mesenchymal stem cells (MSCs) were seeded onto cover slips coated with polymers and allowed to attach for 4 hours. In addition to testing the naked polymers, cell attachment studies were performed on polymers that were first bound with varying amounts of streptavidin (500, 250 and 50 ng/cm$^2$) and some of these were subsequently incubated with bBSA (200 ng/cm$^2$) prior to addition of cells. Cells were allowed to attach for 4 hours at which point the unattached cells were aspirated and Alamar Blue was used to assess the viability of populations of attached cells on the surfaces.

Figure 11:
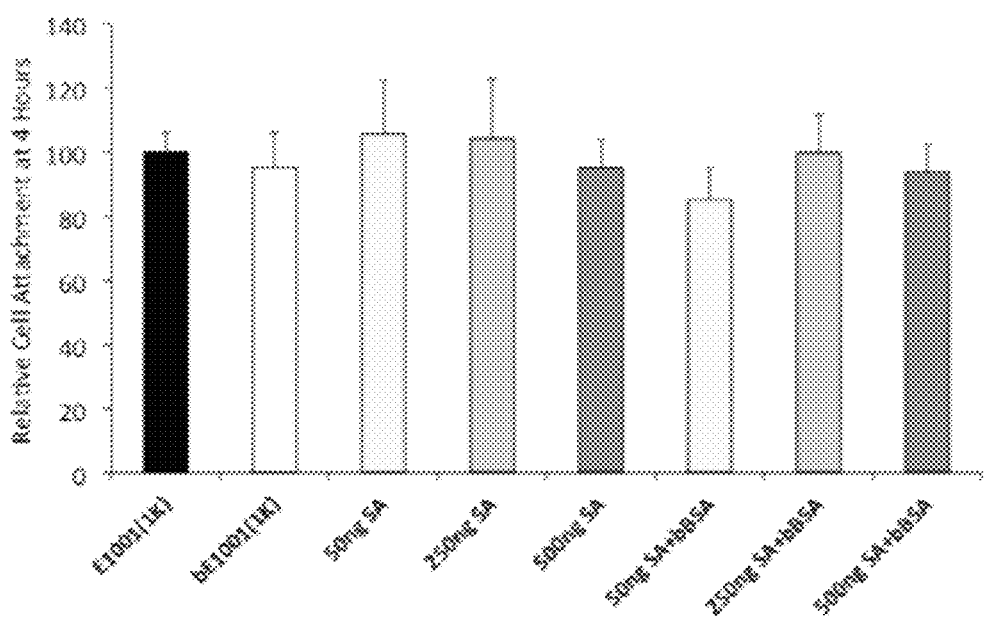
FIG. 11 shows cell attachment of human MSCs on polymers at 4 hours. Polymers were spin-coated onto glass coverslips and correspond to the following: E1001 (1K)-control unmodified polymer, bE1001 (1K)-biotinylated polymer, 50 ng SA-bE1001 (1K) incubated with 50 ng/cm$^2$ of streptavidin (same notation for 250 and 500 ng SA), 50 ng SA+bBSA-bE1001 (1K) incubated with 50 ng/cm$^2$ streptavidin followed by 200 ng/cm$^2$ of biotinylated BSA (bBSA).

The results of these assays found that all polymers, regardless of proteins bound to the surface, displayed cell attachment characteristics similar to the unmodified control polymer (FIG. 11). These results indicate that biotinylation of the polymer with or without tethered streptavidin+1-bBSA does not affect the ability of cells to attach to the polymer surface.

Cell Proliferation on Polymers:

Similar to cell attachment, primary human MSCs were seeded onto cover slips coated with polymers+/−streptavidin+/−bBSA and allowed to adhere for 24 hours. At this point, media was supplemented with 10 uM BrdU and the cells were allowed to culture for 16 hours prior to washing and fixation with 4% paraformaldehyde. Cells were immunostained with anti-BrdU followed by a fluorescent secondary antibody and the percentage of BrdU positive cells was assessed by fluorescent microscopy by counting the number of DAPI positive cells and BrdU positive cells.

Glass Transition Temperature:

Applicants next compared the glass transition temperature (Tg) of the biotinylated E1001 (1K) with the non-biotinylated E1001 (1K) parent polymer. The polymer glass transition temperature was determined with Differential Scanning calorimetry using a Mettler Toledo DS823e. To prepare a sample, 5-10 mg of a polymer was placed an aluminum pan and covered with an aluminum lid. Two heat cycles were implemented in the experiments. In the first heat cycle, the temperature was cooled to −50° C. and heated to 175° C. at a rate of 10° C./min. Then the temperature was kept at 175° C. for 10 min. After cooling to −50° C. the sample was heated to 175° C. at a rate of 10° C./min in the second heat cycle. Data analysis was performed using star evaluation software. In the second heat cycle, Tg was obtained from the tangent at the midpoint (ASTM) of the change of the specific heat between beginning and end of the transition and the corresponding temperature.

Measurements of Tg reveal that biotinylation causes only a minor shift: 95 degrees for the unmodified polymer to 93 degrees for the biotinylated polymer (Table 1). This indicates that the biotinylated polymer will remain structurally solid upon insertion into the body.

Water Contact Angle Measurements:

The biotinylated polymer was then analyzed for the water contact angle as compared with the non-biotinylated polymer. A goniometer (Rame-Hart) was used to measure the contact angle of the respective polymers. 50 µl drops of deionized water were placed onto the polymer surface and the advancing contact angle on each side of the drop was measured immediately. A humidified chamber was then placed over the apparatus and a contact angle was measured again after 2 hours.

The initial results of this experiment showed that the biotinylated polymer had an average water contact angle of 71 degrees and the non-biotinylated polymer had an average water contact angle of 72 degrees. This angle was measured again after two hours in a humidified chamber, revealing that the biotinylated polymer again compared very closely to the non-biotinylated polymer with water contact angles of 54 degrees and 57 degrees, respectively. The initial measurement indicates that both polymers are similarly hydrophobic initially while the measurements at 2 hours show that this is maintained as the polymers continue in contact with water.

TABLE 1

Physical properties of biotinylated
E1001 (1K) and unmodified E1001 (1K)

| | E1001 (1K) | Biotinylated-E1001 (1K) |
|---|---|---|
| Tg | 95° | 93° |
| Water Contact Angle (Initial) | 72° | 71° |
| Water Contact Angle (2 hours) | 57° | 54° |

Scaffold Fabrication, Sterilization, and Characterization:

The similarities of the biotinylated and non-biotinylated polymer indicate that handling and fabrication of the materials are comparable. One application of an embodiment of the present invention is to regenerate a critical size defect in the rabbit calvaria. In these applications, a 15 mm diameter circle of the calvaria is removed and a 15 mm×~2 mm porous scaffold is inserted into the void. Scaffolds were fabricated using a combination of solvent casting/porogen leaching-phase separation techniques. 300 mg of polymer was dissolved in 300 µL of DI water and 3 mL of 1,4-dioxane. NaCl which was sieved to 212-425 µm particle size was weighed into a Teflon dish (11 g). The polymer solution was slowly poured over NaCl and was allowed to diffuse undisturbed for 1 hour. The Teflon dish was covered to prevent evaporation of solvent. After 1 hour, the mold was frozen in liquid nitrogen for 5-10 minutes and then freeze-dried for 48 hours. Dried scaffolds were cut to size using custom-made stainless steel punchers with inner diameter of 16.2 mm and 10.4 mm and incubated in DI water at room temperature to leach out NaCl. The presence of Cl— ions was analyzed by addition of $AgNO_3$ solution to the wash. When no NaCl could be detected in the wash the leached scaffolds were removed and dried overnight in vacuum at room temperature. Scaffolds were sterilized using a 12-hour cycle of Ethylene oxide (EtO) at room temperature (AN74i, Andersen products, Haw River, N.C.). Sterility was verified using a dosimeter (AN-87, Andersen Products, Haw River, N.C.). The samples were subsequently degassed in a vacuum oven (−101.6 kPa) at room temperature and the absence of residual EtO was measured by $^1$HNMR.

Figure 12:
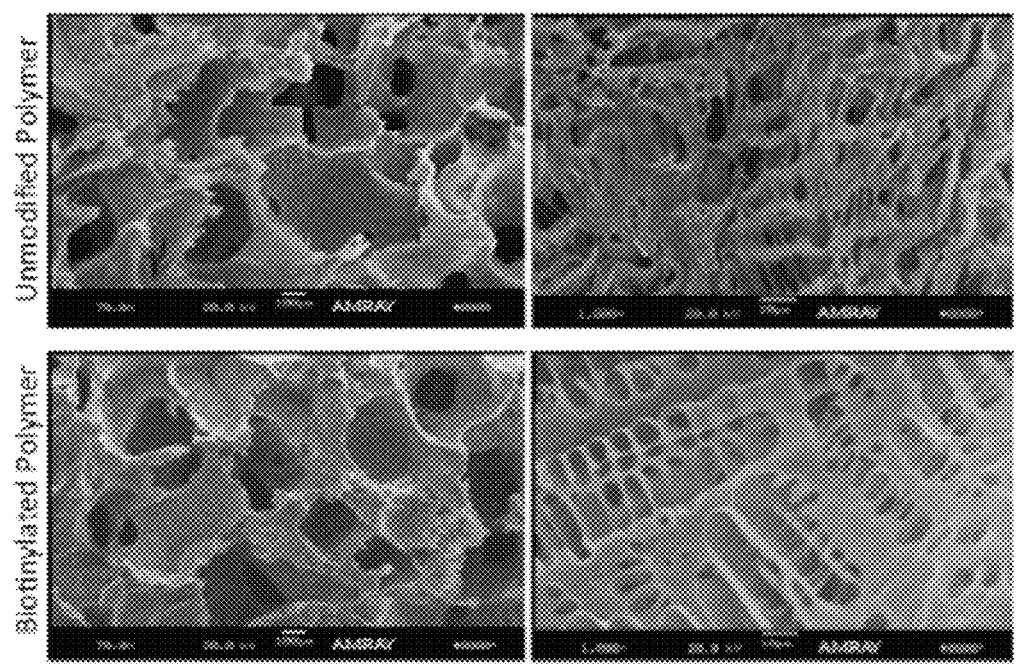
FIG. 12 displays SEM micrographs of 3D porous scaffolds fabricated from unmodified polymer (Top) and biotinylated polymer (Bottom).

Biotinylated polymers and control non-biotinylated polymers were fabricated side-by-side into 15 mm×2 mm 3D porous scaffolds and visualized by Scanning electron Microscopy (SEM) used to assess the porosity of the scaffolds (Amray 18301, 20 kV). FIG. 12 shows that the biotinylated and non-biotinylated scaffolds show similar architecture. Both scaffolds display macropores hundreds of microns in diameter and micropores 5-50 microns in diameter. The nature of the images indicates interconnectivity of the macropores, which aids in the migration of cells throughout the scaffold interior.

Molecular Weight Measurements:

Knowing that scaffolds could be fabricated from the biotinylated polymers and that the porous structure of the scaffolds fabricated from non-biotinylated polymers could be replicated, Applicants next determined the effects of biotinylation, fabrication and sterilization on the molecular weight (MW) of the polymer. The polymer molecular weight averages were determined relative to polystyrene standards using gel permeation chromatography in dimethylformamide with 0.1% (v/v) trifluoroacetic acid as the solvent system. Polymer samples were prepared by dissolving 10-15 mg of polymer in 1 ml of solvent and filtering into a 1 ml vial. The experimental set-up comprised of the following components: Waters 717 Plus autosampler, Waters 510 HPLC unit, Waters 515 HPLC pump, Protein Laboratories gel columns with 103-105 angstrom pore size and a Waters 410 Refractive Index Detector. The experiments were conducted at a 0.8 ml/min flow rate and at room temperature. Data analysis was performed using Water Empower 2 software to integrate the area under the chromatogram to calculate MW averages and polydispersity of polymer samples.

Figure 13:
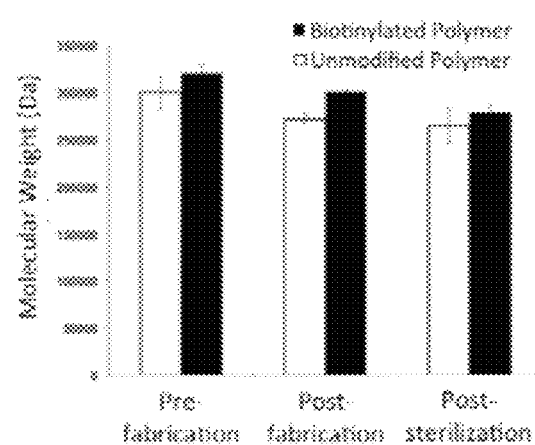
FIG. 13 shows changes in molecular weight associated with polymer biotinylation, fabrication into 3D porous scaffolds, and sterilization by ethylene-oxide.

The base polymer used in these studies was E1001 (1K) with a MW of 300 kDa. Following biotinylation of 50% of the carboxylic acid residues of this polymer, the MW increased by 7% to 321 kDa (FIG. 13). While fabricating the scaffolds, it is common that a slight drop in MW is observed. Accordingly the MW of the base polymer dropped to 272 kDa during the fabrication process, a decrease of 9.3%. The MW of the biotinylated polymer similarly decreased by the small margin of 6.2% during the fabrication process. Following fabrication it is necessary to sterilize scaffolds, which can also affect the MW. Scaffolds were sterilized by exposure to ethylene-oxide for 12 hours and MW were measured, revealing that non-biotinylated scaffolds MW decreased a further 7 kDa and the biotinylated scaffolds decreased 21 kDa. As such, the changes in MW of the biotinylated polymers are consistent with the non-biotinylated polymer previously shown to perform well in vivo in the rabbit calvaria bone regeneration model.

Tethering of Proteins in 3D Scaffolds:

Applicants next verified the ability to tether proteins throughout 3D sterilized scaffolds. Scaffolds were first degassed by submerging the scaffolds in 0.1M phosphate buffered saline (PBS) pH 6.0 by exposing the scaffolds to several low pressure/atmospheric pressure cycles. Each scaffold was then placed on a Swinnex 25 filter holder (Millipore) and 2 mL of a 25 ug/mL solution of Fitc-labeled streptavidin (strep-Fitc) in 0.1M PBS pH 6.0 was loaded on a 3 mL syringe and allowed to flow through the filter holder. Thereafter, 2 mL of a 25 ug/mL solution of alexa 555-labeled biotinylated bovine serum albumin (bBSA) in 0.1M PBS pH 6.0 was flowed for two passes in the same fashion as the Fitc-labeled streptavidin solution. Scaffolds were washed each time after flowing streptavidin and bBSA by flowing 1 mL of 0.1M PBS pH 6.0. To qualitatively assess the degree and spatial distribution of streptavidin and bBSA uptake, scaffolds were embedded in optimum cutting temperature compound (OCT) overnight at −80° C. Then, the scaffolds were cryosectioned into 50 um slices and imaged under a 10× objective using a Leica TCS SP2 confocal microscope. The gain, offset, and exposure time for all images were kept constant in order to obtain unbiased images between control and biotinylated scaffolds.

Figure 14:
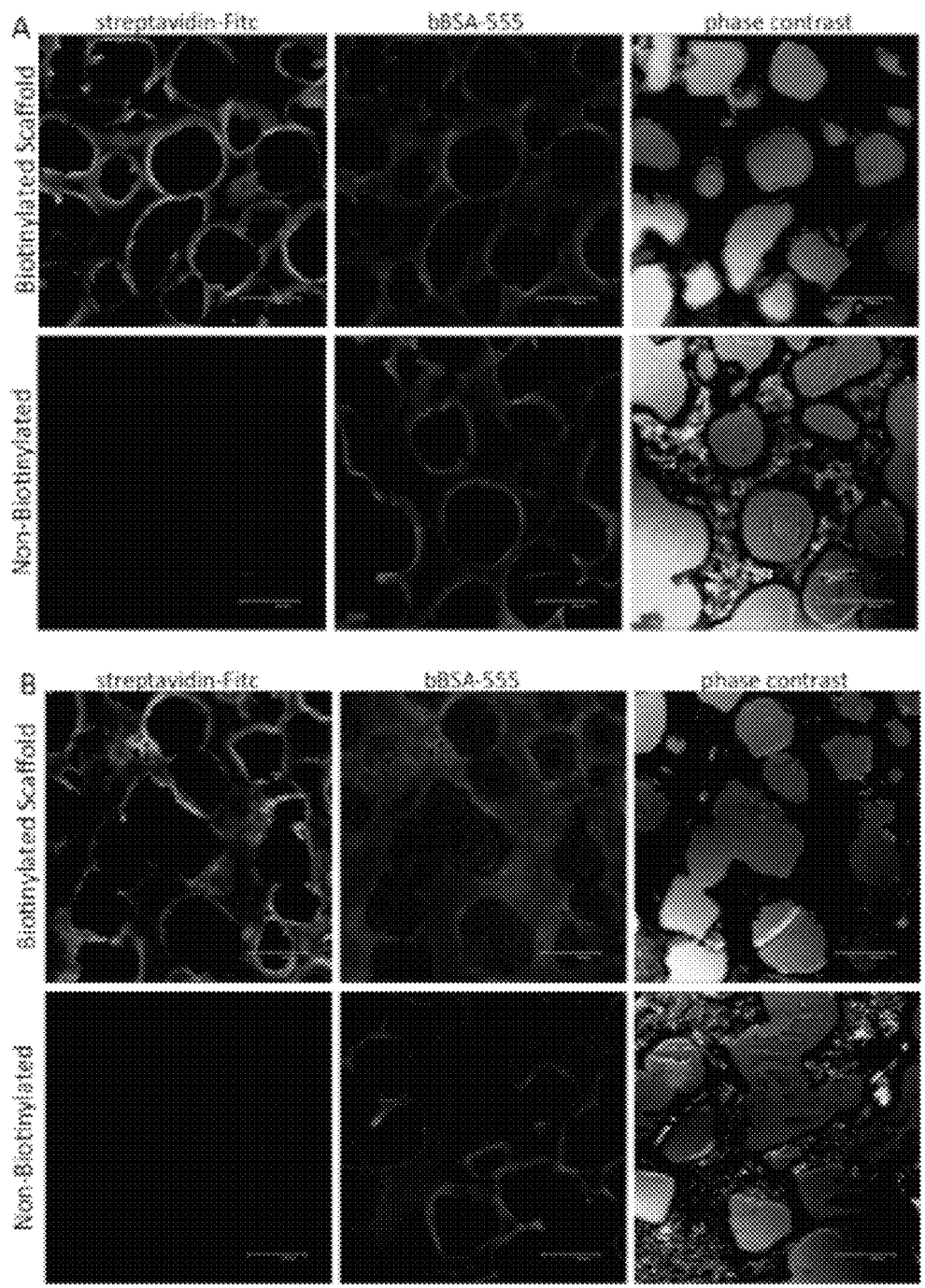
FIG. 14 illustrates tethering and adsorption of fluorescent proteins in biotinylated and non-biotinylated 3D scaffolds. Streptavidin-Fitc and bBSA-alexa-555 were flowed through 3D scaffolds and after sectioning, fluorescence was visualized by confocal fluorescent microscopy. Images taken at 10×200 μm below the surface of the section. Panels A and B are each composed of a biotinylated scaffold and non-biotinylated control scaffold infused with the fluorescent proteins in parallel. Images taken from control and biotinylated scaffolds performed with identical gain, offset, and exposure times. Scale bar=300 μm.

The presence of strep-Fitc was noted on the biotinylated scaffolds by the fluorescent signature of the Fitc on the scaffold surfaces (FIG. 14). Similar to what was noted by QCM-D, strep-Fitc did not appreciably adsorb to the surface of the non-biotinylated polymer surface. Visualization of the alexa-555 fluorescent signature by confocal microscopy indicated that the bBSA-555 tethered to the strep-Fitc that was tethered to the polymer surfaces of the biotinylated scaffolds. The non-biotinylated scaffolds were conducive to bBSA-555 adsorption, again, similar to what was seen in the QCM-D experiments.

Adsorption of bBSA-555 into the non-biotinylated scaffolds was irregular compared to the tethering seen with biotinylated scaffolds tethered with strep-Fitc. This variability is highlighted in the two samples shown in FIG. 14, where the top image indicates bBSA-555 adsorbed to the surface of the non-biotinylated scaffold in levels similar to what was tethered via the streptavidin-biotin linkage in the biotinylated scaffold. The lower image shows that for two scaffolds treated identically, bBSA failed to adsorb on non-biotinyalted scaffolds in as much as was noted for the biotin-streptavidin tethering. This finding highlights one of the features of the tethering strategy using biotin and streptavidin. The kinetics of biotin binding streptavidin are extremely fast and strong, making it so that if a biotinylated protein is only transiently exposed (such as during a flowing system) to the streptavidin coated surface of the scaffold it becomes tethered.

Tethering of Distinct Biomolecules to a Single Biotinylated Scaffold:

Applicants next determined whether distinct biomolecules could be tethered to a single biotinylated scaffold in discrete locations. Scaffolds were fabricated from biotinylated E1001 (1K) as previously described and exposed to streptavidin as previously described. Following washing off of unbound streptavidin, one half of the scaffold was dipped into a solution of 50 biotinylated BSA that had been labeled with an Alexa555 red fluorescent marker for 15 minutes. Scaffolds were removed from this solution and washed with PBS to remove any untethered biotinylated BSA with the Alexa555 marker. The scaffold was next dipped in a solution containing 50 µg/mL of biotinylated BSA labeled with FitC green fluorescent marker. The scaffold was exposed to this for 30 mins., and was thereafter washed with PBS, sectioned, and imaged via confocal microscopy.

Figure 15:
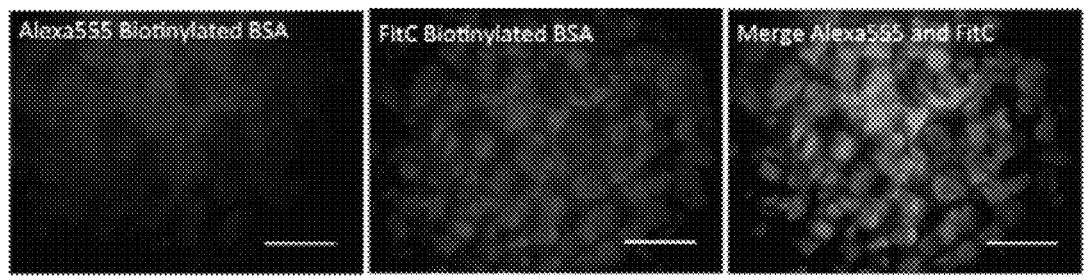
FIG. 15 shows images of multiple fluorescent factors tethered to a single scaffold fabricated from biotinylated polymers to create gradients of tethered factors, interfaces of tethered factors, and simultaneously tether multiple factors. Scale=1 mm.

As shown in FIG. 15, images obtained via fluorescent confocal microscopy found that a single scaffold could be tethered simultaneously with multiple proteins. Several findings are evident from these images. First, separate proteins can be tethered within a single scaffold in discreet locations. This would allow devices fabricated from biotinylated polymers to be used in application areas where separate tethered biomolecules would be necessary in discreet locations to create an ideal response. For example, tissue interfaces such as where bone meets cartilage may be formed using our technology by tethering pro-bone growth factors in one part of the scaffold and pro-cartilage growth factors in another part. As cells infiltrate or are seeded onto the scaffold, they receive localized signals in discrete locations that induce their formation of bone and cartilage. Cells at the interface of the pro-bone and pro-cartilage signals would be expected to adopt either fate and form an integrated interface between the two tissue types.

Second, the yellow portion of the scaffolds shown in FIG. 15 indicate that both FitC and Alexa555 biotinylated BSA were localized to this area of the scaffold. As such, the present invention broadly allows for tethering of multiple biomolecules into a single scaffold at ratios determined by the user of the technology. Ordinarily, the degree and strength of adsorption of biomolecules onto a surface is greatly influenced by the individual chemistry and conformation of the biomolecule being adsorbed together with the chemistry and conformation of the surface. In contrast, the strength and affinity of the biotin-streptavidin interaction is so high that it has the capacity to override the contributions of individual chemistry and conformation. The effect minimizes the contribution of the individual chemistry and conformation and effectively equalizes the affinities of biomolecules to be tethered. The result is that any number of distinct biomolecules can be tethered to our biotinylated polymers so long as the biomolecules are biotinylated.

Third, this study showed that gradients of biomolecules can be tethered to scaffolds fabricated from our biotinylated polymers. As evidenced by the images showing Alexa555 alone, the signal from this fluorophore shows areas of higher concentration/fluorescent signal from where the scaffold was completely immersed into the Alexa555 biotinylated BSA solution and show areas of lower concentration/fluorescent signal from areas where the scaffold was less immersed. The ability to create gradients of biomolecules tethered to scaffolds fabricated from our biotinylated polymers can have broad application. Many modifications to the procedure described to create the gradient are possible.

The fourth observation from these experiments is that the previous three methods and technologies described in this example can be applied separately or in any combination together. Multiple proteins can be applied simultaneously in pre-determined levels in discrete locations of a single scaffold fabricated from our biotinylated polymers within gradients if desired.

Figure 16:
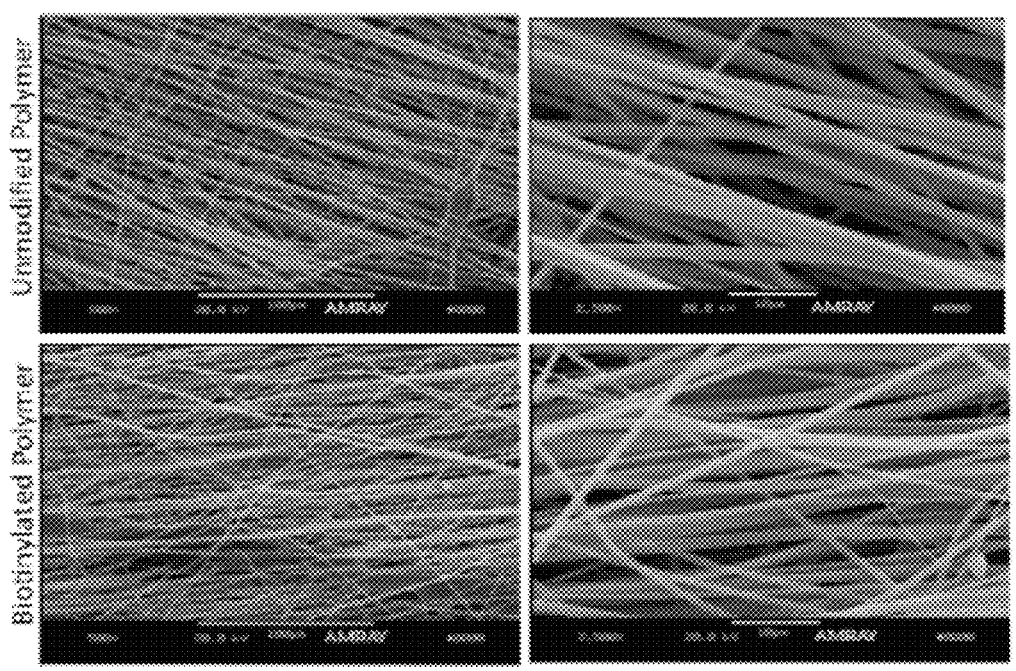
FIG. 16 displays scanning electron micrographs of fiber mats fabricated by electrospinning from biotinylated polymer and the unmodified base polymer.

Effect on Electrospun Fiber Mats:

Previously gained data has indicated that biotinylation of tyrosine-derived polycarbonates via activation of the carboxylic group on the so-called "DT" component of the polymer (FIG. 1) caused minimal alterations to the polymer properties. This is an indication that the broad fabrication potential of tyrosine-derived polycarbonates and related polymers is preserved when a biotin is added to the DT-component as previously described. As further evidence of this scaffolds were fabricated via electrospinning of both biotinylated E1001 (1K) and control E1001 (1K) using procedures previously described in US Patent Application No. 2010/0166854. Using the electrospinning protocols, fiber mats were obtained (FIG. 16) that closely resemble the fiber mats fabricated from the control E1001 (1K) polymer. This data further indicates that the described family of biotinylated polymers can be fabricated into any device compatible with their chemistry and likely will mimic the fabrication potential of the non-biotinylated parent polymers.

Biotynilation of rhBMP-2

Figure 17:
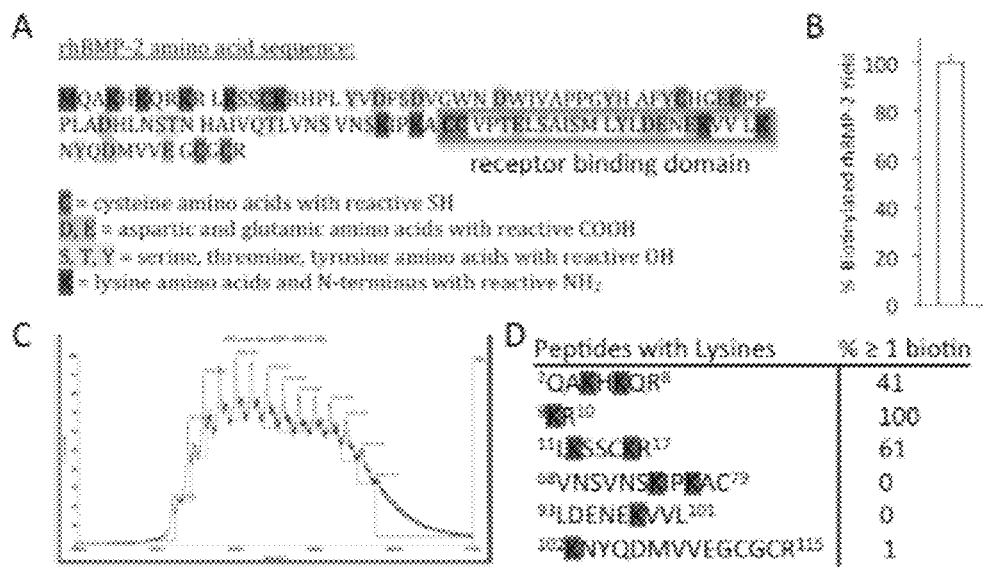
FIG. 17(A) illustrates the amino acid sequence of rhBMP-2 highlighting by color the amino acids with reactive side chains capable of biotinylation.
FIG. 17(B) shows the average yield of biotinylated rhBMP-2 obtained following dialysis shows nearly 100% recovery.
FIG. 17(C) shows a histogram of MWs obtained by MALDI-TOF for biotinylated rhBMP-2.
FIG. 17(D) depicts peptide fragments obtained from rhBMP-2 using trypsin or chymotrypsin that contain lysine residues targeted for biotinylation and the percentage of these peptide fragments on biotinylated rhBMP-2 that have at least 1 biotin.

To develop a strategy for biotinylation of rhBMP-2 consideration was given to the overall amino acid sequence with relation to structure, active domains such as receptor binding and heparin binding, as well as mutational studies that identified which single amino acids were critical for activity. Reactive side chains of amino acids suitable for targeted biotinylations include sulphur (cysteine), hydroxyl (serine, threonine, tyrosine), carboxylic acid (glutamic acid, aspartic acid and the C-terminus) and primary amines (lysines and N-terminus) (FIG. 17A). Of these choices, biotinylation of free amines would avoid adding a biotin within the most sensitive segments of the receptor binding domain. In addition, protein crystallography revealed that all lysines, except for K98 and K102, localize within heparin binding domain.

Recombinant human bone morphogenetic protein-2 (rhBMP-2) was obtained from two vendors, Peprotech (*E. coli*-derived) and Humanzyme (HEK293T-derived). Biotinylation proceeded similarly for both proteins and only Humanzyme rhBMP-2 is discussed hereafter. For biotinylation, a procedure was developed to selectively biotinylate primary amines (lysines and the N-terminus) that do not lie within the receptor binding domain (FIG. 17A). In this procedure, 100 µg of lyophilized rhBMP-2 is resuspended in 100 µl of 4 mM hydrochloric acid (HCL). To this solution was added the biotinylation reagent in a volume of 1-4 µl that brings the molarity of the biotinylation reagent in the ~104 µA reaction mixture to 695 µM. Three biotinylation reagents were tested: Thermo Scientific NHS-PEO$_4$-biotin (Cat#21955), Sigma BAC-Sulfo-NHS (Cat# BTAG), and Invitrogen 6-((6-((biotinoyl)amino)hexanoyl)amino)hexanoic acid, succinimidyl ester (cat# B1606). All three reagents yielded equivalent results as to the degree of biotinylation. The reaction mixture was sat at room temperature for four hours and was subsequently placed in Thermo Scientific Slide-A-Lyzer Mini dialysis Units, with MW cutoff of 7000 (Cat#66373), which was in turn placed within a 1 L beaker containing a diluent solution. 12 diluents were tested, with the optimal performers being a citrate solution (0.2 M Na citrate, 0.2 M citric acid, pH 4.8-5.6) and 4 mM HCL. The biotinylated rhBMP-2 was dialyzed over 40 hours with 8-10x diluent exchanges and the quantity of protein recovered was analyzed by Bradford dye. The degree of biotinylation was analyzed via MALDI TOF and the relative placement of biotins on the free amines within rhBMP-2 was assessed via protease digestions (trypsin or chymotrypsin) followed by LC-MS.

Activity of this purified biotinylated rhBMP-2 was assessed on MC3T3-E1 murine calvarial osteoblasts over 5 days. Activity of the bone-indicating enzyme, alkaline phosphatase (ALP), induced by biotinylated rhBMP-2 was compared against that induced by control non-biotinylated rhBMP-2. ALP activity was detected from cells seeded at an initial density of 3000 per well in a 24-well plate after 5 days via the Biovision Alkaline Phosphatase Fluorometric Assay Kit (cat# K422). To test the activity of tethered biotinylated rhBMP-2, 15 mm coverslips were prepared with biotinylated E1001 (1K) coating the coverslips by spin-coating from a 1% polymer solution and vacuum dried and sterilized by UV for 30 mins. Coverslips were first equilibrated with dPBS for 30 minutes and then exposed to 3 μg of streptavidin per coverslip in 1 mL of dPBS for 1 hour under orbital shaking. Following 4 washes to remove untethered streptavidin, biotinylated rhBMP-2 was placed on the coverslips in 300 μl of dPBS. Coverslips were again washed and 3000 MC3T3-E1 cells were plated onto each coverslip and activity was analyzed after 5 days in comparison to a single administration of soluble, unbiotinylated rhBMP-2.

Biotinylation was clustered on lysines within the heparin binding domain, which when bound to streptavidin would mimic the structural display of rhBMP-2 when bound to heparin with natural extracellular matrix. Following the above-described purification protocol, unreacted and/or hydrolyzed biotinylation reagent was remove to obtained excellent yield, recovering an average of 99% of the original rhBMP-2 input (FIG. 17B).

Figure 18:
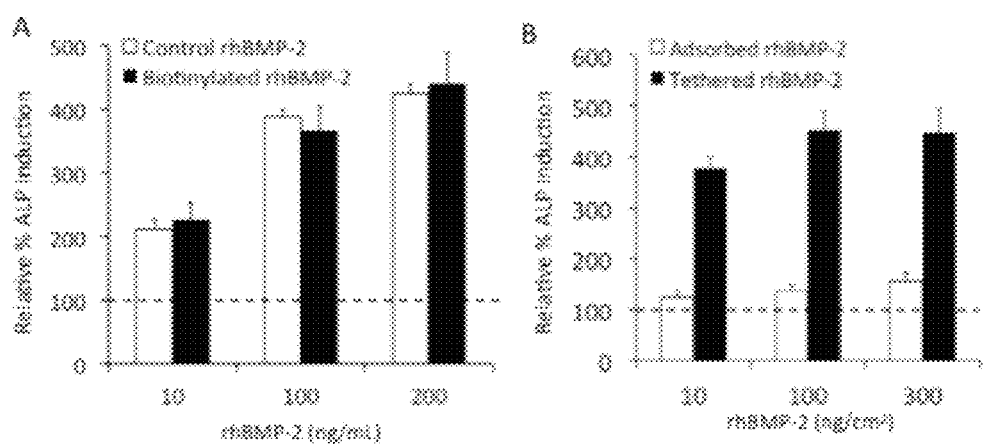
FIG. 18 shows relative activity of biotinylated rhBMP-2 and control unbiotinylated rhBMP-2. (A) illustrates alkaline phosphatase (ALP) activity measured from MC3T3-E1 osteoblasts following administration of biotinylated or control rhBMP-2 in solution. (B) illustrates relative ALP induction in MC3T3-E1 osteoblasts by tethered biotinylated rhBMP-2 and adsorbed rhBMP-2. The dotted line in both graphs indicates baseline ALP induction in MC3T3-E1 cells unstimulated by any rhBMP-2.

Activity of this biotinylated rhBMP-2 was compared against control rhBMP-2 by administering both within the cell culture media. It was found that biotinylated rhBMP-2 was fully able to induce expression of ALP from MC3T3-E1 osteoblasts to the same extent as control rhBMP-2 (FIG. 18A). This indicates that the method and components of biotinylation and purification yielded rhBMP-2 that does not show diminished activity compared to control rhBMP-2.

As tethering of rhBMP-2 has the potential to increase potency by preventing receptor-mediated internalization of rhBMP-2 following stimulation of receptors, a cell-induction assay was tested as well. Biotinylated rhBMP-2 was tethered to streptavidin that was bound to a biotinylated polymer coating on a coverslip, and the ability of this tethered rhBMP-2 was compared against the activity of a single equivalent dose of rhBMP-2 adsorbed onto the polymer surface. The results of this assay showed that tethered rhBMP-2 was able to stimulate ALP production in MC3T3-E1 osteoblasts to a significantly greater extent than the equivalent amount of rhBMP-2 adsorbed to the polymer surface (FIG. 18B). This data strongly supports that tethering of rhBMP-2 via streptavidin to our biotinylated polymer enhances the activity and presentation of rhBMP-2.

Similar biotinylation and purification protocols were developed for several proteins, exemplifying the versatility of this tethering mechanism to the biotinylated polymers of this invention. These proteins are BSA (Sigma BTAG reagent and purification spin column), trypsin inhibitor (Thermo Scientific 21955 NHS-PEO$_4$-biotin 21955 and purified by dialysis in ddH$_2$0), and the neuroinductive protein L1 (Thermo Scientific 21955 NHS-PEO$_4$-biotin 21955 and purified by the spin columns supplied in the kit). Tethering on these molecules was confirmed using QCM-D as previously described. Thus, any molecule that can be biotinylated can be tethered to the biotinylated polymers. The broad fabrication potential of biotinylated polymers and the versatility for biotinylating and tethering nearly any molecule are evidence that this technology can be utilized for virtually any application. For example, one can tether rhBMP-2 for bone and cartilage applications, L1 for neural applications, and PDGF-BB for bone and/or vascular applications, and VegF for vascular applications. These constitute a small number of the applications this technology could be used for.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A method for creating a biotinylated polymer comprising:
   (a) providing a biocompatible polymer comprising tyrosine-derived monomeric repeating units having the structure:

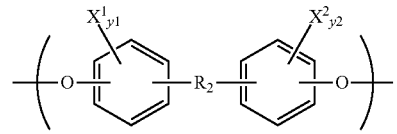

wherein each X is independently H, I or Br, Y1 and Y2 for each diphenol unit are independently between 0 and 4, inclusive;

each R$_2$ independently has the structure:

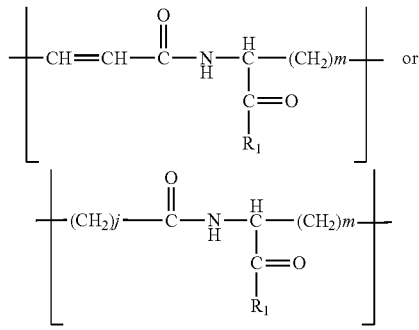

wherein j and m are independently an integer from 1 to 8, inclusive, and wherein the subgroup R$_1$ is an OH group;

(b) activating the carboxylic acid group on said biocompatible polymer, thereby priming the carboxylic acid residues for nucleophilic attack; and (c) reacting the activated carboxylic acid group with a nucleophile, wherein the nucleophile comprises biotin.

2. The method of claim 1, wherein said biocompatible polymer has a structure according to Formula I:

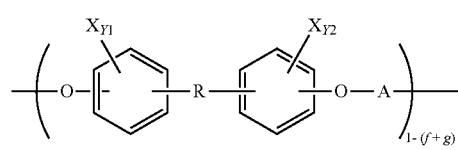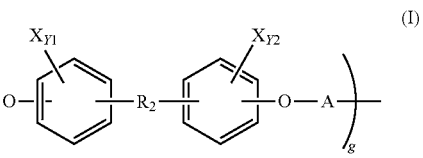 (I)

wherein each X is independently H, I or Br, Y1 and Y2 for each diphenol unit are independently between 0 and 4, inclusive;

each R and $R_2$ independently has the structure:

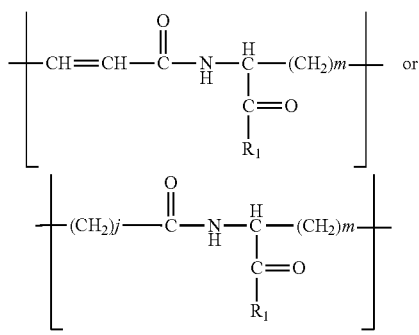

wherein j and m are independently an integer from 1 to 8, inclusive, and wherein, for $R_2$, the subgroup $R_1$ is OH, and, for each R, $R_1$ is independently an O-alkyl group wherein the alkyl group contains from 1 to 18 carbon atoms and from 0 to 5 heteroatoms selected from O and N;

A is selected from the group consisting of:

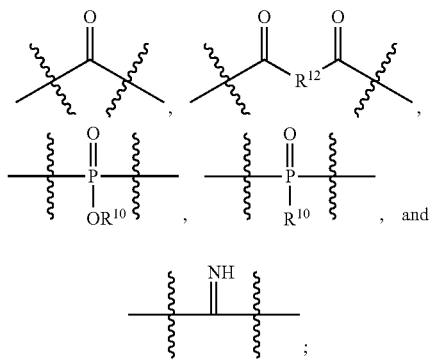

wherein $R^{10}$ is selected from the group consisting of H, $C_1$-$C_{30}$ alkyl, alkenyl and alkynyl and $C_2$-$C_{30}$ heteroalkyl; heteroalkenyl and heteroalkynyl, and $R^{12}$ is selected from the group consisting of $C_1$-$C_{30}$ alkyl, alkenyl and alkynyl, $C_1$-$C_{30}$ heteroalkyl; heteroalkenyl and heteroalkynyl, $C_5$-$C_{30}$ heteroalkylaryl, heteroalkenylary and heteroalkynylaryl, $C_6$-$C_{30}$ alkylaryl, alkenylaryl and alkynylaryl and $C_5$-$C_{30}$ heteroaryl;

P is a poly($C_1$-$C_4$ alkylene glycol) unit having a molecular weight between about 500 and about 20,000; f is between 0 and about 0.60; g is between about 0.1 and 1.0; and f+g is between about 0.1 and 1.0.

3. The method of claim 1, wherein the biocompatible polymer is a polycarbonate or a polyarylate.

4. The method of claim 1, further comprising binding a multivalent biotin-binding protein to the biotinylated polymer.

5. The method of claim 4, wherein the multivalent biotin-binding protein is selected from the group consisting of streptavidin, avidin and neutravidin.

6. The method of claim 4, wherein a biotinylated molecule is bound to the multi-valent protein.

7. The method of claim 6, wherein the biotinylated molecule is selected from the group consisting of antibodies, proteins, and enzymes.

8. The method of claim 7, wherein the biotinylated molecule is biotinylated bone morphogenic protein.

9. The method of claim 1, wherein the nucleophile is an amino-PEG-biotin.

10. A biotinylated polymer comprising tyrosine-derived monomeric repeating units having the structure:

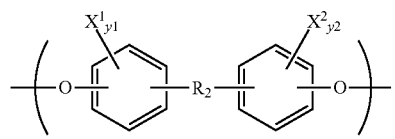

wherein each X is independently H, I or Br, Y1 and Y2 for each diphenol unit are independently between 0 and 4, inclusive;

each $R_2$ independently has the structure:

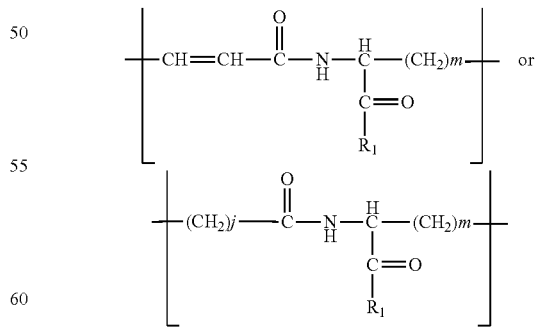

wherein j and m are independently an integer from 1 to 8, inclusive, and wherein the subgroup $R_1$ comprises biotin.

11. The biotinylated polymer of claim 10, having a structure according to Formula I:

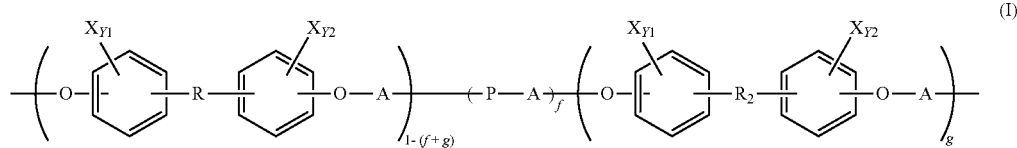

wherein each X is independently H, I or Br, Y1 and Y2 for each diphenol unit are independently between 0 and 4, inclusive;

each R and $R_2$ independently has the structure:

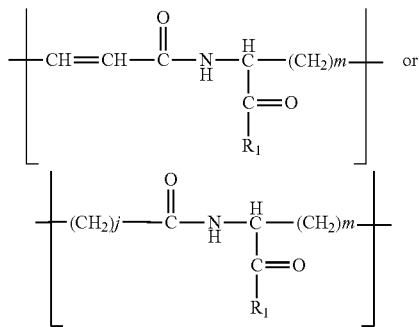

wherein j and m are independently an integer from 1 to 8, inclusive, and wherein, for $R_2$, between about 0.1 and about 99.0 percent of the $R_1$ subgroups comprise biotin and between about 1 and about 99.9 percent of the $R_1$ subgroups are an OH group, and, for each R, $R_1$ is independently an O-alkyl group, wherein the alkyl group contains from 1 to 18 carbon atoms and from 0 to 5 heteroatoms selected from O and N;

A is selected from the group consisting of:

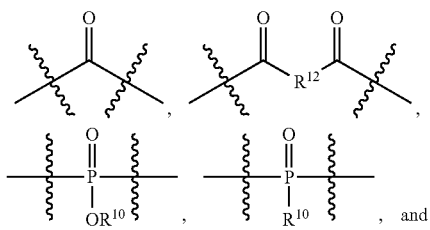

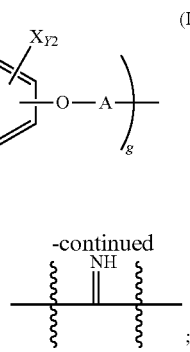

wherein $R^{10}$ is selected from the group consisting of H, $C_1$-$C_{30}$ alkyl, alkenyl and alkynyl and $C_2$-$C_{30}$ heteroalkyl; heteroalkenyl and heteroalkynyl, and $R^{12}$ is selected from the group consisting of $C_1$-$C_{30}$ alkyl, alkenyl and alkynyl, $C_1$-$C_{30}$ heteroalkyl; heteroalkenyl and heteroalkynyl, $C_5$-$C_{30}$ heteroalkylaryl, heteroalkenylary and heteroalkynylaryl, $C_6$-$C_{30}$ alkylaryl, alkenylaryl and alkynylaryl and $C_5$-$C_{30}$ heteroaryl;

P is a poly($C_1$-$C_4$ alkylene glycol) unit having a molecular weight between about 500 and about 20,000; f is between 0 and about 0.60; g is between about 0.1 and 1.0; and f+g is between about 0.1 and 1.0.

12. The biotinylated polymer of claim 10, further comprising a plurality of multi-valent biotin-binding proteins bound to said $R_1$ subgroups of R that comprise biotin.

13. The biotinylated polymer of claim 12, wherein the multivalent biotin-binding protein is selected from the group consisting of streptavidin, avidin and neutravidin.

14. The biotinylated polymer of claim 12, wherein a plurality of biotinylated molecules are bound to said multivalent proteins.

15. The biotinylated polymer of claim 14, wherein said biotinylated molecules are selected from the group consisting of antibodies, proteins, and enzymes.

16. The biotinylated polymer of claim 14, wherein said biotinylated molecules are bone morphogenic proteins.

17. The biotinylated polymer of claim 10, where said biotin-containing $R_1$ subgroups of R are —NH-PEG-biotin.

18. The biotinylated polymer of claim 10, wherein the polymer is a polycarbonate or a polyarylate.

19. A polymer scaffold for tissue engineering comprising the biotinylated polymer of claim 10.

20. The polymer scaffold of claim 19, wherein said polymer further comprises a plurality of multi-valent biotin-binding proteins bound to said $R_1$ subgroups of R that comprise biotin.

* * * * *